US012670673B2

(12) United States Patent
Park

(10) Patent No.: US 12,670,673 B2
(45) Date of Patent: Jun. 30, 2026

(54) APPARATUS AND METHODS FOR AUGMENTING VISION WITH REGION-OF-INTEREST BASED PROCESSING

(71) Applicant: SoftEye, Inc., San Diego, CA (US)

(72) Inventor: Edwin Chongwoo Park, San Diego, CA (US)

(73) Assignee: SoftEye, Inc., San Diego, CA (US)

( * ) Notice: Subject to any disclaimer, the term of this patent is extended or adjusted under 35 U.S.C. 154(b) by 170 days.

(21) Appl. No.: 18/185,364

(22) Filed: Mar. 16, 2023

(65) Prior Publication Data

US 2024/0312147 A1    Sep. 19, 2024

(51) Int. Cl.
| | |
|---|---|
| *G06T 19/00* | (2011.01) |
| *G02B 27/01* | (2006.01) |
| *G06F 3/01* | (2006.01) |
| *G06T 3/40* | (2006.01) |
| *G06V 10/74* | (2022.01) |

(52) U.S. Cl.
CPC ........ *G06T 19/006* (2013.01); *G02B 27/0172* (2013.01); *G06F 3/013* (2013.01); *G06F 3/017* (2013.01); *G06T 3/40* (2013.01); *G06V 10/761* (2022.01); *G02B 2027/0178* (2013.01)

(58) Field of Classification Search
CPC .... G06V 10/761; G06V 10/10; G06V 10/147; G06T 19/006; G06T 3/40; G06F 3/013
See application file for complete search history.

(56) References Cited

U.S. PATENT DOCUMENTS

| | | | |
|---|---|---|---|
| 9,471,153 | B1 | 10/2016 | Ivanchenko |
| 9,619,105 | B1 | 4/2017 | Dal Mutto |
| 9,741,169 | B1 | 8/2017 | Holz |
| 9,823,735 | B2 | 11/2017 | Spiessl et al. |
| 11,327,310 | B1 | 5/2022 | Bates et al. |
| 11,847,266 | B2 | 12/2023 | Lee et al. |

(Continued)

FOREIGN PATENT DOCUMENTS

EP        4057610 A1 *  9/2022   ............. H04N 23/57

OTHER PUBLICATIONS

U.S. Appl. No. 18/745,027, filed Jun. 17, 2024, SoftEye, Inc.

(Continued)

*Primary Examiner* — Antonio A Caschera
(74) *Attorney, Agent, or Firm* — Wang Hardoon, P.C.

(57) ABSTRACT

Systems, apparatus, and methods for augmenting vision with region-of-interest based processing. In one specific example, smart glasses may use an eye-tracking camera to monitor the user's gaze and determine the user's gaze point. When triggered, the camera assembly captures a high-resolution image. The high-resolution image may be cropped to a much smaller region-of-interest (ROI) image based on computer-vision analysis of the user's gaze point. For example, if the smart glasses detect a human face at the gaze point, then the ROI is cropped to the human face. In this manner, the smart glasses may leverage specific capabilities of the smart glasses to augment the user experience; for example, telephoto lenses provide long distance vision, or computer-assisted search may direct the user to interesting activity. Other aspects may include e.g., external database assisted operation and/or ongoing cataloging throughout the day.

25 Claims, 9 Drawing Sheets

(56) References Cited

U.S. PATENT DOCUMENTS

| | | |
|---|---|---|
| 2013/0106681 A1 | 5/2013 | Eskilsson et al. |
| 2014/0172881 A1 | 6/2014 | Petrou et al. |
| 2015/0002676 A1 | 1/2015 | Yoo |
| 2015/0049017 A1 | 2/2015 | Weber et al. |
| 2015/0097772 A1 | 4/2015 | Starner |
| 2015/0338915 A1 | 11/2015 | Publicover et al. |
| 2016/0055371 A1 | 2/2016 | Wu et al. |
| 2016/0077337 A1 | 3/2016 | Raffle et al. |
| 2016/0274762 A1 | 9/2016 | Lopez et al. |
| 2017/0195629 A1 | 7/2017 | Wexler et al. |
| 2017/0249009 A1 | 8/2017 | Parshionikar |
| 2017/0351909 A1 | 12/2017 | Kaehler |
| 2018/0103903 A1 | 4/2018 | Tzvieli et al. |
| 2018/0120594 A1 | 5/2018 | Li |
| 2018/0368074 A1 | 12/2018 | Gong et al. |
| 2019/0108492 A1 | 4/2019 | Nelson et al. |
| 2019/0121429 A1 | 4/2019 | Lovtjärn et al. |
| 2019/0213773 A1 | 7/2019 | Lee et al. |
| 2019/0324529 A1 | 10/2019 | Stellmach et al. |
| 2019/0362557 A1 | 11/2019 | Lacey et al. |
| 2020/0026949 A1 | 1/2020 | Alcock et al. |
| 2020/0184726 A1 | 6/2020 | Jo |
| 2020/0379214 A1 | 12/2020 | Lee et al. |
| 2020/0382717 A1 | 12/2020 | Chiu et al. |
| 2021/0027103 A1 | 1/2021 | Brower |
| 2021/0072831 A1 | 3/2021 | Edwards |
| 2021/0201661 A1 | 7/2021 | Jazaery et al. |
| 2021/0248427 A1 | 8/2021 | Guo et al. |
| 2021/0287002 A1 | 9/2021 | Mohapatra |
| 2021/0373657 A1 | 12/2021 | Connor et al. |
| 2021/0390784 A1 | 12/2021 | Smith et al. |
| 2022/0101593 A1 | 3/2022 | Rockel et al. |
| 2022/0103757 A1 | 3/2022 | Ding et al. |
| 2022/0230396 A1 | 7/2022 | Croxford et al. |
| 2022/0326367 A1 | 10/2022 | Matuszak et al. |
| 2022/0373796 A1 | 11/2022 | Meisenholder et al. |
| 2022/0375172 A1 | 11/2022 | Meisenholder et al. |
| 2022/0385617 A1 | 12/2022 | Kim et al. |
| 2022/0391697 A1 | 12/2022 | Mousavi et al. |
| 2022/0404578 A1 | 12/2022 | Lee et al. |
| 2023/0032467 A1 | 2/2023 | Shroff et al. |
| 2023/0038159 A1 | 2/2023 | Holland et al. |
| 2023/0049339 A1 | 2/2023 | Ganguly et al. |
| 2023/0110484 A1* | 4/2023 | Ahn ..................... H04N 23/635 |
| | | 455/411 |
| 2023/0118074 A1 | 4/2023 | Park et al. |
| 2023/0119935 A1* | 4/2023 | Sztuk ................. G02B 27/0172 |
| | | 345/8 |
| 2023/0266819 A1 | 8/2023 | Arbel et al. |
| 2023/0288704 A1 | 9/2023 | Verma et al. |
| 2023/0305632 A1 | 9/2023 | Lee et al. |
| 2023/0333384 A1 | 10/2023 | Zhu et al. |
| 2023/0359272 A1 | 11/2023 | Green et al. |
| 2023/0368326 A1 | 11/2023 | Lee et al. |
| 2023/0368328 A1 | 11/2023 | Lee et al. |
| 2023/0370752 A1 | 11/2023 | Lee et al. |
| 2024/0103613 A1 | 3/2024 | Chawda et al. |

OTHER PUBLICATIONS

U.S. Appl. No. 18/745,233, filed Jun. 17, 2024, SoftEye, Inc.
U.S. Appl. No. 18/745,353, filed Jun. 17, 2024, SoftEye, Inc.
U.S. Appl. No. 18/745,462, filed Jun. 17, 2024, SoftEye, Inc.
Vaswani et al., "Attention Is All You Need," 31st Conference on Neural Information Processing Systems (NIPS 2017).
U.S. Appl. No. 18/061,203, filed Dec. 2, 2022, Te-Won Lee.
U.S. Appl. No. 18/061,226, filed Dec. 2, 2022, Te-Won Lee.
U.S. Appl. No. 18/061,257, filed Dec. 2, 2022, Te-Won Lee.
U.S. Appl. No. 18/185,362, filed Mar. 16, 2023, Edwin Chongwoo Park.
U.S. Appl. No. 18/185,364, filed Mar. 16, 2023, Edwin Chongwoo Park.
U.S. Appl. No. 18/185,366, filed Mar. 16, 2023, Edwin Chongwoo Park.
U.S. Appl. No. 18/316,181, filed May 11, 2023, Te-Won Lee.
U.S. Appl. No. 18/316,203, filed May 11, 2023, Edwin Chongwoo Park.
U.S. Appl. No. 18/316,206, filed May 11, 2023, Te-Won Lee.
U.S. Appl. No. 18/316,214, filed May 11, 2023, Te-Won Lee.
U.S. Appl. No. 18/316,218, filed May 11, 2023, Edwin Chongwoo Park.
U.S. Appl. No. 18/316,221, filed May 11, 2023, Edwin Chongwoo Park.
U.S. Appl. No. 18/316,225, filed May 11, 2023, Edwin Chongwoo Park.
U.S. Appl. No. 63/491,733, filed Mar. 22, 2023, Edwin Chongwoo Park.

* cited by examiner

LENS ELEMENTS

COLOR FILTER ARRAY

CAMERA SENSOR    712

RAW DATA

BIN/PASS-THRU LOGIC    714

IMAGE SIGNAL PROCESSOR

NEURAL NETWORK PROCESSOR

710

DEVELOPED IMAGE DATA

ACTIVATIONS

LAT/LONG COORDINATES, EPHEMERIS

RAW AUDIO DATA

IMU AMPLITUDES/QUATERNIONS

730

720

GPS

AUDIO CODEC
726

724    722

700

APPARATUS AND METHODS FOR AUGMENTING VISION WITH REGION-OF-INTEREST BASED PROCESSING

RELATED APPLICATIONS

This application is related to U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,257 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/185,362 filed Mar. 16, 2023, and entitled "APPARATUS AND METHODS FOR AUG-MENTING VISION WITH REGION-OF-INTEREST BASED PROCESSING", and U.S. patent application Ser. No. 18/185,366 filed Mar. 16, 2023, and entitled "APPA-RATUS AND METHODS FOR AUGMENTING VISION WITH REGION-OF-INTEREST BASED PROCESSING", each of which are incorporated herein by reference in its entirety.

COPYRIGHT

A portion of the disclosure of this patent document contains material that is subject to copyright protection. The copyright owner has no objection to the facsimile reproduc-tion by anyone of the patent document or the patent disclo-sure, as it appears in the Patent and Trademark Office patent files or records, but otherwise reserves all copyright rights whatsoever.

TECHNICAL FIELD

This disclosure relates generally to the field of user and machine interactions. More particularly, the present disclo-sure relates to systems, computer programs, devices, and methods for augmenting vision with region-of-interest based processing.

DESCRIPTION OF RELATED TECHNOLOGY

Traditionally, the interaction between a user and an elec-tronic device (e.g., smartphone, computer, etc.) relies on physical interactions, whether as physical keystrokes, physi-cal movements of a mouse, physical contact on touch-screens, etc. Likewise, a display presents most of the infor-mation shared between the user and the electronic device. However, display-based interactions have limitations. For instance, the display may not be conveniently positioned (e.g., being in the pocket of the user). Similarly, access to the physical device may be limited (e.g., when the user is holding another object such as a suitcase).

Recently, "smart glasses" have garnered significant con-sumer interest. Smart glasses attempt to incorporate com-puter vision processing capabilities in an eyeglass form factor; for example, most implementations of smart glasses use cameras to capture images of the external world, and a heads-up display to provide information to the user. Unfor-tunately, existing smart glasses solutions are ill-suited for everyday wear. Most smart glasses have short run-times (<1 hr) and may have battery weight and heat dissipation issues that are uncomfortable for continuous wear.

Typically, wearable technologies ("wearables") are worn on the body, or next to the skin, for long periods of time. Additionally, most wearables are used for an entire day (or more) without charging. In other words, commercially suc-cessful wearables prioritize user comfort and convenience. While smart glasses have the potential for incredible utility, existing implementations have struggled to satisfy basic usability considerations.

DETAILED DESCRIPTION

Figure 1:
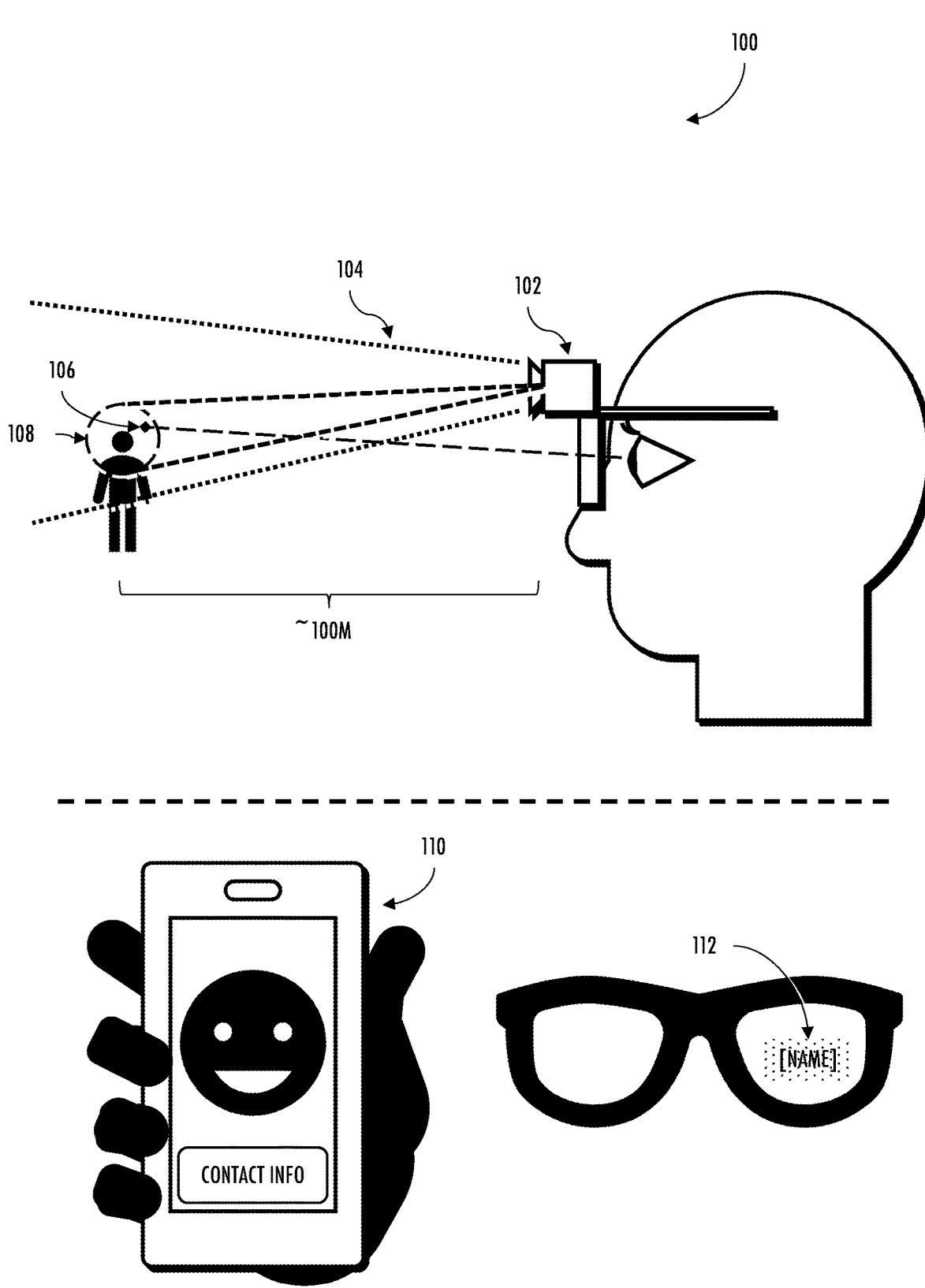
FIG. 1 is a graphical representation of a telephoto usage scenario, useful in accordance with the various aspects of the present disclosure.

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompa-nying description. Alternate embodiments of the present disclosure and their equivalents may be devised without departing from the spirit or scope of the present disclosure. It should be noted that any discussion regarding "one embodiment", "an embodiment", "an exemplary embodi-ment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

Practical Considerations for Smart Glasses

Smart glasses are an emerging technology that is only starting to become commercialized. At this time, most smart glasses re-purpose commodity components. Unfortunately, existing image capture and display components are often optimized for handheld camera and computer monitor applications. These applications are primarily focused on generating visual media for human consumption, e.g., multimedia applications that rely on large image formats and/or vibrant colors. For example, a modern smart phone might include a few cameras with the following image capture capabilities (summarized in Table 1, below):

TABLE 1

| Exemplary Camera Characteristics | | | | | |
|---|---|---|---|---|---|
| Resolution | F-stop | Aperture, Type | Sensor Size | Pixel Size | FOV |
| 108 MPixels | F/1.8 | 24 mm (wide) | 1/1.33" | 0.8 μm | 83° |
| 10 MPixels | F/4.9 | 240 mm (periscope) | 1/3.24" | 1.22 μm | 10° |
| 10 MPixels | F/2.4 | 72 mm (telephoto) | 1/3.24" | 1.22 μm | 35° |
| 10 MPixels | F/2.2 | 13 mm (ultrawide) | 1/2.55" | 1.4 μm | 120° |

While resolution is important, the amount of light that is captured determines a camera's exposure balance, dynamic range, and sharpness. The ability of a camera to capture photons is directly proportional to the camera sensor size, quantum efficiency (QE), and aperture. In other words, a large sensor can capture more light than a smaller sensor for the same shutter speed, ISO (exposure sensitivity) and aperture. While it is possible to compensate for smaller sensor size, these techniques often introduce artifacts and noise.

Mathematically, the image size produced by a lens for a field-of-view (FOV) is directly proportional to its focal length. As a practical matter, however, many different physical parameters affect the ability of a camera to resolve an image and/or the subsequent image quality. Consider, for example, a digital camera that uses a 1/1.8" CMOS sensor could adjust its focal length to provide the same image size as a 35 mm film camera shooting with a 50 mm lens (50 mm/4.73=10.6 mm). If both cameras have the same aperture (e.g., F:2.8), then the aperture is 17.9 mm for the film camera (50 mm/F:2.8) and 3.8 mm for the digital camera (10.6 mm/F:2.8). The larger aperture of the film camera lets in $4.73^2$ or ~22.4× more photons through. As a result, the film camera could be almost 4.5 stops ($2^{4.5}$=22.6) more sensitive to light than the digital camera. In other words, the film camera would have the about the same signal-to-noise ratio (SNR) at ISO 1600 compared to the digital camera at ISO 100.

Notably, raw image quality cannot be improved with signal processing; in other words, signal information can only be preserved through the processing pipeline—it cannot be increased. There are some well-known "tricks" to mask noise with visual artifacts that are ignored by humans (and may even be desirable). Nonetheless, introduced noise cannot be used to boost signal information. For example, increasing exposure time can introduce motion blur from camera shake and object movement; motion blur reduces image sharpness regardless of the sensor's resolution. Also, wider aperture lenses are harder to build without introducing lens distortion artifacts or altering the field of view.

The practical limitations of a camera's form factor can greatly affect image clarity. For reference, most smart phone sensors are 4-5× smaller relative to a DSLR handheld camera sensor. Anecdotally, handheld DSLR cameras (16 MPixels) continue to capture objectively better image quality than a smart phone (108 Mpixels). In fact, even the best smart phone cameras may struggle to provide enough image clarity (rendered on a 6.2-inch screen) to resolve half-inch letters at fifteen feet. These physical form factor limitations are even more constrained for smart glasses, which are expected to be smaller in size (both camera and display dimensions).

Weight, battery capacity, and thermal dissipation are also practical considerations that are very important for smart glasses. To provide augmented reality (AR) and/or extended reality (XR) within an eye glass form factor, most proposed implementations incorporate both camera and display technology. Unfortunately, image data is represented as a two-dimensional (2D) array of pixels, so conventional image processing scales quadratically based on image resolution (i.e., an image that is 2× wide and 2× deep, takes 4× processing time—this is also referred to as having $O(n^2)$ complexity). Processing complexity directly corresponds to memory size, power consumption, and heat dissipation. To meet these demands, most smart glasses have large battery components and/or very short image processing run-times (distinct from standby modes or other non-visual modes). As a relative benchmark, one existing smart glass implementation has an average power consumption of ~2.9 W for 3.3 seconds to capture an image (less than 800 high quality images on a single charge), video recording uses a substantially lower image resolution and provides only <45 min of run-time. Additionally, heat dissipation is a major design consideration. Since smart glasses are worn directly on sensitive skin, running "hot" is immediately noticed and highly undesirable.

As previously noted, existing smart glasses may re-use commodity components. Here, the term "commodity" refers to a good, service, etc. that is fungible (interchangeable) with other goods/services of the same market segment. Commodity goods and services compete based on price, rather than brand recognition, functionality, power consumption, performance, or other differentiable features. In other words, commodity components provide a stable ratio of price to e.g., performance, power consumption, etc. Unfortunately, commodity components are also typically pre-packaged in application specific integrated circuits (ASICs) that are generically suitable for many different applications. For example, a smart glasses implementation might have different ASICs for the camera sensors, image signal processor (ISP), central processing unit (CPU), neural network processor (NPU), memory, etc. that are connected via I/O pads and wiring. Moving data off-silicon and onto wiring is extremely inefficient; each I/O transfer may need tens or even hundreds of milliwatts during the transfer time. For video processing, this is a substantial consideration that further exacerbates the battery capacity and thermal issues.

Most people are accustomed to special purpose eyewear (e.g., many people wear corrective lenses and/or sunglasses). Yet smart glasses have failed to provide the benefits and convenience that would allow for widespread adoption. Market research suggests that smart glasses must provide substantial utility over the course of a day in a convenient and comfortable manner. Given modern battery technologies, this limits the average power consumption of smart glasses to only a few milliwatts an hour between recharges (intermittent peak usage may be much higher).

Camera-Based Imaging and Human Perception

In the photographic and imaging arts, field-of-view (FOV) refers to the extent of the observable world that is contained within an image or data structure. For example, an image with a FOV of 83° spans an angular range of 83° between the edges of the image. The physical arrangement of the lens assembly and image sensor define the field-of-view (FOV) for a camera module; in other words, the lens assembly physically focuses light on a single flat sensor to gather light information. As a practical matter, devices that take a variety of images usually have multiple camera modules (see above e.g., Table 1: Exemplary Camera Characteristics). Historically, users "frame a shot" by aiming the camera such that the interesting aspects of a scene fall within the camera's FOV. Once framed, the user captures an image (an instant in time), or video (a sequence of images over time). In some cases, the image/video may be used "as-is"; increasingly, however, image data may be post-processed for aesthetic effect and/or analyzed with computer-vision algorithms for data extraction.

The study of human perception uses a different definition for field-of-view (FOV). Specifically, in the context of human vision, field-of-view (FOV) refers to the extent of the observable world that could be (but may not actually be) observed by a human. This distinction is important since humans have a visual field of up to 220° (including far peripheral vision), however most vision activity occurs within the central 5° of the visual field (the foveal vision). To avoid lexical confusion, the usage of FOV is made with reference to devices, images, and data structures as used in the photographic and imaging arts throughout, unless expressly described in relation to human perception.

Notably, a human usually "sees" with two eyes that each capture light information on a concave retina. However, human perception actually occurs within the human mind. The mind continuously reconstructs a mental image from both images. To do this, humans do not have a fluid "gaze"-instead, the human visual system (eyes and brain) constantly scans the visual field to build a mental, three-dimensional "map" of the environment. The retina of the human eye is an incredibly dense nerve tissue; in fact, that the retina does not have blood vessels and relies on diffusion to provide the nerves oxygen and nutrients. Limitations on diffusion distances result in a very small area of high acuity; only about 1-2 degrees of the visual field can be used to resolve objects. During the scanning process, the human eyes move very quickly with abrupt starts and stops ("saccadic movements"). A "saccade" (or saccadic movement) is a quick, simultaneous movement of the eyes between phases of "fixation". Fixation refers to voluntary control of a fixed gaze on a single point. Saccadic movement allows the human brain to piece together small pieces of visual information (e.g., less than 1-2 degrees of visual field) into a much higher resolution image. In other words, the saccadic movements enable the brain to efficiently work around the limitations of the retina.

Microsaccades are small, jerk-like, involuntary eye movements that typically occur during fixation. Research suggests that microsaccades may correct displacements in eye position produced by drifts, and/or prevent the retinal image from fading. Empirically, microsaccade amplitudes vary from 2 to 120 arcminutes. While saccades can be captured with sampling frequencies as low as 10 Hz, microsaccades are much faster and require sampling frequencies no less than 120 Hz. For the purposes of the present disclosure, a gaze is "fixed" (fixation) when eye movement is below a threshold amplitude (e.g., <120 arcminutes or 2 degrees of movement) for longer than a threshold time (e.g., 1 second). In other words, the threshold amplitude and threshold time may be used to adjust the sensitivity of fixation detection to ignore microsaccade movements (which are unrelated to user interest).

The differences in operation between camera-based imaging and human perception creates significant issues. Most devices attempt to create images that appear "natural" to human vision—this is generally referred to as a camera that uses a "normal focal length" to capture images. The ideal normal focal length mathematically models the perspective from a point at a "normal viewing distance". Conceptually, this model may be visualized as holding a photograph at arm's length that would have an indistinguishable perspective when viewed with one eye shut.

Mathematically, the ideal normal lens has an angle of view that is close to one radian)(~57.2958° of the image circle. Perspective distortion refers to warping or transformation of an object and its surrounding area that differs significantly from what the object would look like with a "normal focal length." Shorter focal length lenses are also commonly called "wide-angle" lenses; at the periphery they may impart "fish-eye" or "barrel" type distortions. Longer focal length lenses are commonly called "telephoto" lenses—at the periphery they impart a "pincushion" type distortion. For a variety of reasons, most devices have one or more camera modules with longer or shorter focal length than the ideal "normal focal length" (e.g., 10° or "periscope", 35° or "telephoto", 83° or "wide", 120° or "ultra-wide", etc.)

Most importantly, perspective distortions are affected by both distance and focal length-two shots of the same object, from the same distance, will exhibit identical perspective geometry, regardless of lens used. In other words, an image of a person's face captured with a normal lens would have the same linear perspective geometry as if the image were captured at the same distance with a wide-angle lens, or a telephoto lens. However, the normal lens might capture the person's face, the wide-angle lens might fit the entire person's body, and the telephoto lens might only capture the nose. Conversely, if all three images are framed such that the person's face fills the entire FOV, the wide-angle will be used at a much closer distance, making the nose larger compared to the rest of the photo, and the telephoto will be used from farther, making the nose smaller compared to the rest of the photo.

As previously alluded to, most commercial attempts at smart glasses have assumed that widespread adoption would be driven by augmented reality (AR)/extended reality (XR). Usually, these prototypes are designed to immerse the user in a virtual environment (or a mixed presentation of virtual and real environments). However, rendering a persistent ("always-on") virtual/mixed reality requires high-resolution cameras and/or display processing that quadratically scales ($O(n_2)$) relative to resolution and display.

Some implementations of virtual reality (VR) and augmented reality (AR) applications attempt to leverage the limitations of human perception for device operation. For example, so-called "foveated rendering" renders different regions of an image based on the user's gaze. The region that is the focus of the user's gaze is rendered at the highest resolution. Peripheral regions may be rendered at reduced resolution; conceptually, this should reduce the computational load of display rendering. Unfortunately, however, foveated rendering infers the user's gaze based on eye-tracking and modeling. High-speed gaze inference (greater than 120 Hz) is needed to match the human eye's peak activity; at these rates, the processing burden of gaze inference significantly reduces the benefits of foveated rendering. Due to the preconceived notions of smart glasses utility and high cost of eye-tracking (e.g., foveated rendering), most conventional smart glasses manufacturers do not use eye-tracking and gaze inference.

Finally, one tangential, but very important piece of context should be noted. Head movement (and eye-movement, in particular) is highly indicative of attention, regardless of task or motion. While a human can move their gaze to independently of their head, typically humans will focus on an object by pointing their head to center their gaze. Current vision research also suggests that eye movement is closely tied to the human thought processes; and, by extension, human intention may be inferred from eye movement.

Intent-Based Processing of a Region-of-Interest

Various aspects of the present disclosure are directed to augmenting a human's natural visual and mental capabilities. In one specific implementation, the exemplary smart glasses combine a high-resolution sensor with a telephoto lens to capture images beyond the user's natural vision. In some variants, the images may be displayed to the user via the smart glasses. In other variants, the images may be locally processed with onboard computer-vision for e.g., region-of-interest (ROI) detection, text recognition, facial recognition, object-recognition, and/or other data extraction (e.g., QR codes, visual markers, etc.). In some cases, the extracted data may be utilized as inputs to applications, which may be accessible on an associated electronic device (e.g., a smartphone) or directly via the Internet (e.g., corporate infrastructure, and/or publicly accessible websites that are directly accessible by the smart glasses).

Related aspects of the present disclosure are directed to determining a region-of-interest based on gaze fixation and an inferred gaze point. In one specific implementation, the smart glasses use eye-tracking, head positioning, and/or other hands-free cues to infer gaze fixation. Eye-tracking logic can remain in a low power state (or reduce power) during normal eye scanning movement; once gaze fixation occurs, the eye-tracking logic may transition to an operational state to perform gaze inference. During gaze inference, the smart glasses can track eye movement more frequently (and potentially with infrared (IR) illumination) to infer the presence of a gaze point. By scaling processing complexity at each stage, high complexity processing can be performed on an "as-needed" basis (only standby resources are "always-on"). More directly, unlike other eye-tracking solutions (e.g., foveated rendering, etc.) which attempt to "follow" the user's eye movement regardless of context, the exemplary embodiments detect user interactions (e.g., visual fixation, hand movements) relative to physical/virtualized objects before enabling sensory augmentation.

Conceptually, eyewear has multiple salient distinctions over other personal effects; by extension, these distinctions may be leveraged by smart glasses in much more intuitive ways compared to other handheld devices and wearables. Firstly, eyewear is worn on the head whereas most other devices may be used with any arbitrary orientation relative to the user's body. For example, a user may switch hands to hold their phone or place it on a table during use. In contrast, once donned, handling eyewear of any kind is generally undesirable (e.g., to avoid scratches and/or smudging). Additionally, eyewear is consistently worn in a physically precise location relative to the user's face e.g., eyes, ears, and mouth. Head movement is also generally much more stable and deliberate relative to other body motion, even during strenuous activity. Hand-eye coordination and proprioception are also basic physical skills that most capable adults possess. For example, many people can instinctively "point at a target" with great accuracy by aligning their outstretched index finger and their dominant eye to the target.

Various aspects of the present disclosure leverage the unique nature and positioning of eyewear to enable both touch-free sensory augmentation and/or operation. Gaze fixation and head, eye, and/or hand movements may be used to operate the smart glasses without physical touching (e.g., hands-free operation). For example, the smart glasses may use various physical cues to control an amount of camera zoom, trigger a snapshot/video capture, etc. Reducing the number and frequency of use for physical input features (buttons, switches, dials) may allow for more compact and robust industrial designs and improve overall user convenience. As one notable implementation, the user may focus their gaze on an object for at least a set period of time. Holding a steady gaze for longer durations (ignoring microsaccades) may e.g., allow for progressively tighter gaze vectors. The fixation data may additionally be used to e.g., zoom-in on a region-of-interest, or adjust the scale/size of feature detection. For example, an initial selection period could be 3 seconds; holding the gaze for 4 seconds may result in a 2× zoom, 5 seconds may result in a 4× zoom, etc. In another such example, focusing on a person could be done in 3 seconds, the person's upper torso in 4 seconds, the person's face in 5 seconds, etc.

Certain usage scenarios demand more granularity and/or control which may extend beyond the on-board smart glasses interface. Thus, various embodiments of the present disclosure closely couple the user's smart glasses to another UI-centric device (such as a smart phone or a laptop). As but one such example, a smart phone touchscreen may be used to manipulate and/or extract data from an image (captured via the smart glasses). Examples of such manipulations may include e.g., zoom-in, zoom-out, crop, rotate, filters, etc. Still other embodiments may extend these capabilities to other sensor modalities which may also be collected via the smart glasses (e.g., audio, etc.)—e.g., audio noise removal for a recorded conversation, etc. Examples of data extraction may include optical character recognition (OCR), language translation, QR code lookup, URL lookup, etc.

While the present discussion is described with visible physical objects, the techniques could be broadly extended to other senses, both physical and virtual. For example, acoustic variants could use head positioning and/or gaze inference to beamform audio reception (focusing in on a source of sound). Similarly, augmented reality (AR)/extended reality (XR) applications may render the virtual/mixed environment with spatial aspects (e.g., locations, distances, etc.)—in such implementations, head positioning and/or gaze inference may be used to affect the user's experience in virtualized/mixed space.

Example Operation, Vision Augmentation

In one exemplary embodiment of the present disclosure, the smart glasses may use an eye-tracking camera to monitor the user's gaze. When the user's gaze is fixated, the smart glasses may use one or more forward-facing cameras to determine the user's gaze point.

The smart camera may additionally monitor for gesture-based inputs to trigger an action, such as are described in U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", and U.S. patent application Ser. No. 18/061, 257 filed Dec. 2, 2022, and entitled "SYSTEMS, APPARATUS, AND METHODS FOR GESTURE-BASED AUGMENTED REALITY, EXTENDED REALITY", each of which were previously incorporated herein by reference in its entirety. For example, telephoto vision may be triggered based on gaze fixation and a hand gesture (e.g., a two-handed zoom gesture, a two-fingered pinch motion, etc.). As another example, a user might read a gauge or follow a QR code URL using a "point" or "tapping" gesture, etc. In some cases, the duration and/or intensity ("strain") of the gaze may also be treated as a user interaction. For example, a user may stare at an object longer to zoom-in and/or correct object misidentification, etc.

Once triggered, the camera assembly captures a high-resolution image. In one specific embodiment, the high-resolution image may be cropped to a much smaller region-of-interest (ROI) image based on computer-vision analysis of the user's gaze point. The computer-vision analysis may be based on artificial intelligence, machine-learning, or other image recognition techniques. In particular, the smart glasses perform an initial detection to identify the nature of the object at the gaze point (e.g., e.g., text, face, vehicles, and/or other objects), and then crop to the identified object. For example, if the smart glasses detect a human face at the gaze point, then the ROI is cropped to the human face.

Multiple aspects contribute to the overall reduction in processing complexity and/or power consumption. For example, ROI-based processing can be used to reduce the amount of data read from an image sensor since only the approximate area of the sensor that corresponds to the ROI needs to be read. Reducing readout size allows for less data traffic (reduced power) and shorter reads (reduced latency). In addition, certain camera sensors may incorporate parameters that provide synergistic effects during ROI-based processing; for example, binning could be used with ROIs for closer objects to greatly minimize data size without substantial differences in performance.

Neural network processing scales in complexity based on the size of the network. Notably, a neural network may reduce network complexity and/or performance to improve power consumption, etc. The ability to flexibly adjust and/or trade-off operational parameters may be particularly useful where e.g., a region-of-interest (ROI) is identified by user interaction (e.g., gaze fixation). In other words, a neural network can identify the contours of a face, a body of text, QR codes, a vehicle, etc. on a small image area with significantly smaller networks (on the order of a few microwatts ($\mu$W)). At these power levels, neural network processing is more efficient than conventional pattern matching (based on pixel-by-pixel processing). More broadly, a variety of different computer vision algorithms may be used to select faces, objects, text, geographic features, etc. The following discussions provide several specific examples of sensory augmentation applications.

Notable Variant, Telephoto "Super" Vision

FIG. 1 depicts a first "telephoto" usage scenario 100. As shown, the smart glasses may include a telephoto camera assembly 102 characterized by a field-of-view (FOV) 104 at or below 20° coupled to a 100 Mpixel (Mp) camera sensor. The telephoto camera assembly 102 enables image capture at ranges that far exceed the unaided human eye. In one specific embodiment, eye-tracking cameras illuminate the user's eyes and determine gaze vectors from the location of the pupil relative to the retina. During focused sight these vectors converge to a single point in space. Depending on the accuracy of the vectors, the convergence may be modeled as a point, a 2D shape, or a 3D volume (e.g., a cube, cone, pyramid frustrum, etc.). The convergence in space provides a distance and direction from the user which can be used to select an appropriate camera lens. In other variants, the smart glasses may incorporate range finding techniques (e.g., time-of-flight (TOF), stereo vision, laser, infrared, etc.) to determine when telephoto vision is desired. In other words, when the user's gaze point 106 is at long range (greater than 100 ft), then the smart glasses uses the telephoto camera assembly 102.

Consider the following facial detection/facial recognition use case. A 16:9 landscape camera sensor with 100 Mp that creates an image 13.3K pixels across and 7.5K pixels tall. The width of a person's head would be no less than 15 centimeters (cm) (7 inches (in)) and coarse recognition machine learning (ML) can reliably identify faces with ~60 pixels. Thus, the smart glasses could reliably identify a person at distances of ~100 meters (m), or about a football field away. Notably, the foregoing calculations are based on sensor densities circa 2023, as sensor densities continue to increase the range of visual perception will also increase (e.g., a 200 MP sensor would increase the effective range by 40%). Larger faces or objects (animals, cars, etc.) could be seen at further distances. Similarly, lower FOV (e.g., 10°) would also greatly increase range.

More broadly, so-called "retina displays" offer about 60 pixels per degree (PPD), or 1 pixel per arcminute, this corresponds to the physical limitations of the human eye over a wide array of environmental conditions. Notably, the absolute limitations of human perception are higher. For example, the human brain can determine whether two lines are aligned to a resolution around two arcseconds (an effective 1800 PPD). Similarly, the minimal separable acuity, or the smallest separation at which two lines can be perceived as two distinct lines, is around 0.5 arcmin under ideal laboratory conditions, or 120 PPD. However, these feats are attributed to interpolation that occurs in the brain, rather than the physical mechanisms of the eye. For relative comparison, a camera assembly can capture resolutions far below 1 pixel per arcsecond (60 arcseconds in one arcminute). Converting an image from a first resolution (or PPD) to a second resolution (or PPD) may be more commonly referred to as a "digital zoom". In the previous example, a FOV of 20° coupled to a 100 Mpixel (Mp) camera sensor provides ~665 PPD. In other words, this is a 10× improvement over the capabilities of the human eye. In fact, telephoto lenses with sensors as low as 20 Mp can provide digitally zoomed image quality that is substantially better than unaided human visual acuity.

As a brief aside, "facial detection" and "facial recognition" are two related but distinct technologies that involve analyzing images or video footage of faces. Facial detection refers to the process of identifying the presence of a face in an image or video. It involves detecting the location, size, and orientation of a face within an image or video frame, and it can be used for a variety of purposes such as focusing a camera on a person's face, tracking the movement of a person's face, or detecting whether a person is looking at a screen. Facial recognition, on the other hand, involves identifying a specific individual from a database or set of images by comparing their facial features to those of other individuals. It typically involves using algorithms to analyze various characteristics of a face, such as the distance between the eyes, the shape of the nose and mouth, and the contours of the face, to create a unique "faceprint" that can be compared against a database of known faces.

As a practical matter, these machine learning techniques have different goals, design trade-offs, and applications. For example, the error rates (either false positive/false negatives) in facial detection and facial recognition can vary depending on a variety of factors, including the quality of the technology, the environment in which it is being used, and the specific application of the technology. In general, error rates in facial detection (~1-2%) tend to be far less common than facial recognition (10-20%), for similar processing complexity and/or power consumption. While the present discussion describes a facial detection/facial recognition application, artisans of ordinary skill in the related arts will readily appreciate that similar considerations broadly apply to object detection/recognition, text (character) detection/recognition, and/or other similar computer vision applications.

Notably, while the smart glasses have enough pixel information to perform facial detection, it may not always be beneficial to handle facial recognition within the smart glasses themselves. For example, the smart glasses may not have sufficient power, memory, and/or processing resources to carry out facial recognition, nor a library of faces to match against. In this scenario, a companion device 110 might be better suited for this purpose. However, only a relatively small area of the total image size may be of interest for facial recognition (e.g., possibly only a few hundred pixels). In other words, the entire image includes a significant amount of unneeded image data; transferring excess data off the smart glasses to the companion device 110 would be both inefficient and unnecessary for facial recognition.

In this example, since the user is fixated on a person at great distance, the facial detection logic of the smart glasses may identify the location and/or presence of a face (but not an identity) at the gaze point 106. The face data may be cropped out of the telephoto image to create the "region-of-interest" (ROI) image 108. Only the ROI image 108 is transferred to the companion device 110 for facial recognition; this greatly reduces the amount of data that is transferred and processed for both the smart glasses and the companion device. In other words, the companion device also only needs to perform the facial recognition on the ROI. The reduction in data size allows for faster, more efficient transfer and downstream computing.

If facial recognition is successfully performed, then the companion device 110 may provide information (e.g., a name, nickname, phone number or other identifying information) for the identified person to the smart glasses; this information may be displayed as text via a heads-up display (HUD) 112 of the smart glasses. In some implementations the companion device 110 may display e.g., a profile view of the identified person and/or the cropped ROI for the user's independent visual confirmation.

In some embodiments, the smart glasses may retain the entire image for subsequent reference and/or future post-processing. As but one such example, the companion device may request image data that is adjacent to the ROI for e.g., active image panning. In one specific implementation, the user may use their gaze point to identify an initial ROI which is cast to their phone device. However, once the user looks at their companion device (smart phone, etc.), the user can control the ROI manually. In other words, the camera maintains its current ROI and the user may actively pan the ROI displayed on their phone left-right, up-down, to get a better look at the surroundings. Additional detection and/or recognition steps may be used to read text (e.g., a street sign, house address, person, etc.), identify other people, and/or objects, etc. As another example, the user may zoom-in/zoom-out on the companion device for e.g., context (other nearby people, objects, etc.)—this may entail additional requests for image data from the smart glasses' ongoing capture.

While the foregoing example is presented in the case of a companion device that performs the recognition task, the ROI may be sufficiently small enough to perform feature recognition on the smart glasses themselves. For example, the smart glasses may have onboard library of faceprints (e.g., a "recently viewed" and/or "most contacted" library) and sufficient onboard processing resources (e.g., an image signal processor (ISP), dedicated computer-vision processor, or similar processor) to perform feature recognition.

Figure 2:
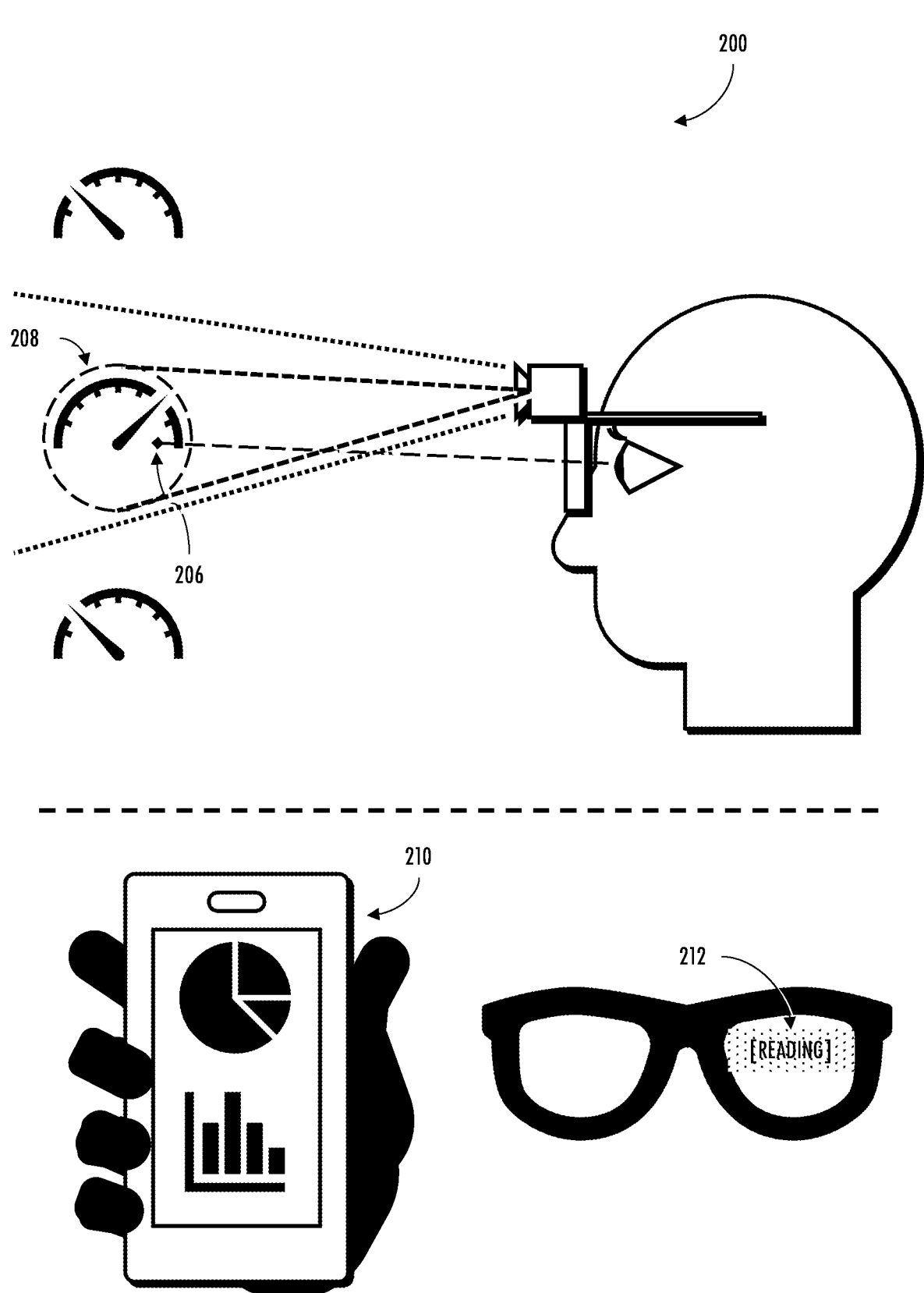
FIG. 2 is a graphical representation of an industrial usage scenario, useful in accordance with the various aspects of the present disclosure.

Additionally, the foregoing example is presented within the context of facial detection/recognition applications, however, telephoto vision may have applicability in a variety of other applications. Consider the industrial usage scenario 200 depicted in FIG. 2. As shown, a worker periodically inspects a set of instrument gauge panels. Notably, the gauge panels may be difficult to read due to e.g., absolute distance from the worker, relative distance between related gauges, environmental conditions (steam, darkness), size, etc.

In this example, the user's gaze point 206 may be used to identify a gauge (ROI 208). In some cases, the ROI 208 depicting the gauge reading may be directly provided to the user via the HUD 212. In some implementations, the machinery may separately report the measured information to networked servers, etc. These reports can be accessed using a gauge identifier. Thus, once the worker has identified the gauge of interest, the data can be retrieved from the network servers and provided to e.g., the worker's companion device 210. In some cases, the companion device 210 may provide additional visualizations of data (e.g., a history of gauge readings and/or distribution of gauge readings over time, etc.). In some other examples, the companion device may be able to concurrently display the gauge readings from multiple different instrumentation panels at once.

More directly, sensory augmentation may extend beyond telephoto vision. Other types of sensory augmentation may include magnification, minification, color filtered vision, extra-spectral vision, and/or any number of other visual techniques. Additionally, onboard computer vision processing may implement image processing corrections to remove lens distortions and/or other capture artifacts. Depending on the application and available resources, the periodicity and/or scan detail may be done at a variety of different distances, time intervals, and/or resolutions. For example, image processing may rotate text, flip mirrored text, correct for barrel (fisheye)/perspective, etc. Text-based variants may perform optical character recognition (OCR) and/or reproduce a text display (which may be more readable than the OCR'ed image). More directly, far off text, or even partially obscured text, might be difficult to read even when magnified—in some cases, OCR and/or computer-vision analysis may be used to reconstruct the likely text, and display the recovered text to the user.

While the foregoing discussion is presented in the context of visual information, the techniques may be broadly extended to audio and/or other sensory contexts. For example, the smart glasses may use audio beamforming to listen-in on conversations that would be too difficult to hear, etc. In some scenarios, audio beamforming may be combined with voice analysis to provide captioning (e.g., thus allowing a person to listen-in, even in very noisy environments.)

Notable Variant, Computer-Vision Assisted Search

Figure 3:
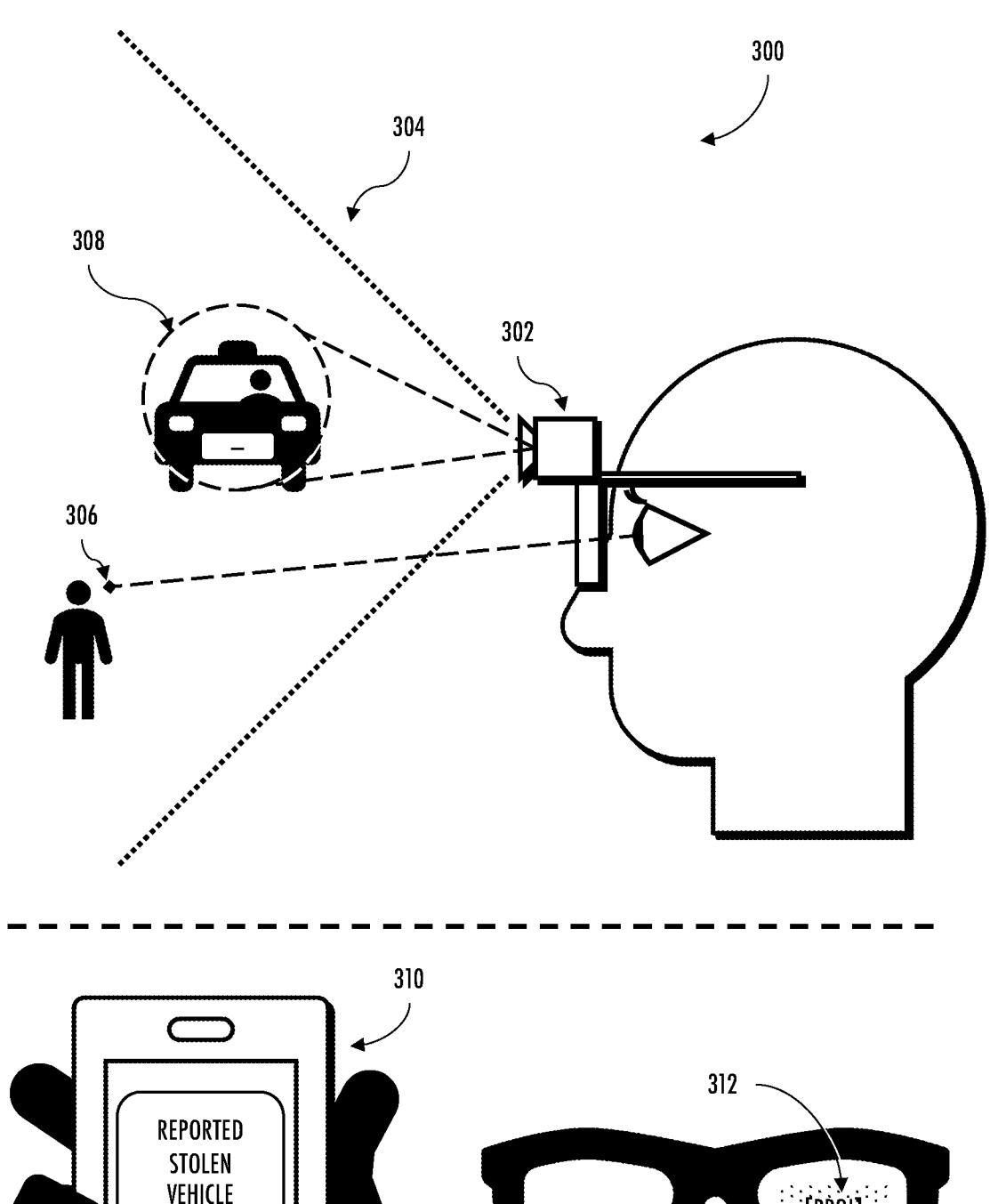
FIG. 3 is a graphical representation of a law enforcement scenario, useful in accordance with the various aspects of the present disclosure.

Human perception is limited both by sensory capabilities as well as attention-span. While the foregoing discussion is based on a user specified region-of-interest (ROI) derived from a gaze point, other embodiments of the present disclosure may inform the user of a potential region-of-interest (PROI) based on a computer-vision assisted search. Consider the scenario 300 depicted in FIG. 3 where a law enforcement officer is on the lookout for a suspect and/or a vehicle license plate. The law enforcement officer may be busy talking to another person, looking the wrong way, or otherwise distracted. In the following use case, the smart glasses scan for interesting events/objects using a wide or ultra-wide angle FOV camera 302.

As previously alluded to, the device FOV 304 encompasses a much larger view angle than the law enforcement officer's gaze point 306. In some cases, the scan may be performed over multiple cameras—e.g., the smart glasses may have rearward, sideward, upward, and/or downward facing cameras that allow for up to 360° scanning. In one exemplary embodiment, the smart glasses may periodically scan the entire device's FOV for potential objects of interest (e.g., text, face, vehicles, and/or other objects).

In one specific implementation, the smart glasses may use a preliminary scan (e.g., facial detection, object detection, text recognition). Then, if further detail is needed, the smart glasses may notify the user of a potential match. The law enforcement officer may be instructed to "look closer" toward a particular area—in some cases, the smart glasses may visually identify the potential region-of-interest (PROI) 308 (e.g., via a heads-up display (HUD) 312). In other embodiments, the glasses may merely instruct the user to turn their head left-right, up-down (e.g., arrow LEDs, or similar signaling). Still other variants may display a cropped version of the PROI 308; the user may then quickly determine whether further inspection is necessary (potentially without moving their current head positioning).

Once the user has pointed their head toward the potential region-of-interest, the smart glasses capture a high-resolution image using a narrower FOV camera (e.g., telephoto, etc.). As previously noted, the high-resolution image may be cropped down to a specific ROI. The reduced size of the ROI is easier to process, store, and/or display. In some cases, the high-resolution image may be presented to the law enforce-ment officer via the smart glasses or a companion device 310 (e.g., smart phone, etc.). In other cases, the high-resolution image may be re-assessed by onboard logic (e.g., facial recognition to match against the suspect's face, text recognition to match against a license plate, etc.). Furthermore, while the foregoing example is a real-time application, the smart glasses may also store information of interest for archival, refinement, and/or post-processing. Within the context of law enforcement, this may be particularly useful to buttress/rebut evidence and/or testimony (e.g., similar to body camera footage, etc.).

As previously alluded to the smart glasses may augment multiple sensory modalities of a human user. For example, extra-spectral cameras (e.g., thermal vision, night vision, etc.) may be used for scanning and/or subsequent high-resolution capture. This may enable operation in low-light/no-light situations. Many such capabilities may be extended to a variety of extreme/emergency situations; for example, extra-spectral vision may be used by firefighters to identify unconscious victims in a smoke-filled room (which might not be apparent with normal vision). Thermal vision may be used to assess risk of a fire/backdraft before breaching a door. Various other sensory modalities may be substituted with equal success—e.g., audio variants may use computer assisted analysis to pick out interesting sounds, etc.

Notable Variant, Database Assisted Search

As previously alluded to, facial recognition is generally more difficult than facial detection; conceptually, this is because finding a matching faceprint in a library of faceprints is based on the size and quality of the library. However, narrowing the library of faceprints to a subset of candidate faceprints that are likely matches may greatly improve facial recognition (reduced complexity, lower error rates). Many smart phones and other personal digital assistants have access to a user's calendar of events and related contact information (including faceprints), thus some "database assisted" implementations may pre-seed the smart glasses with the library of faceprints that the user already intends to meet. While the following example is presented in the context of a smart phone companion device, other implementations may use Wi-Fi access points tied to corporate infrastructure and/or event planning databases (e.g., for networking events). Still other external database implementations may be substituted with equal success.

Figure 4:
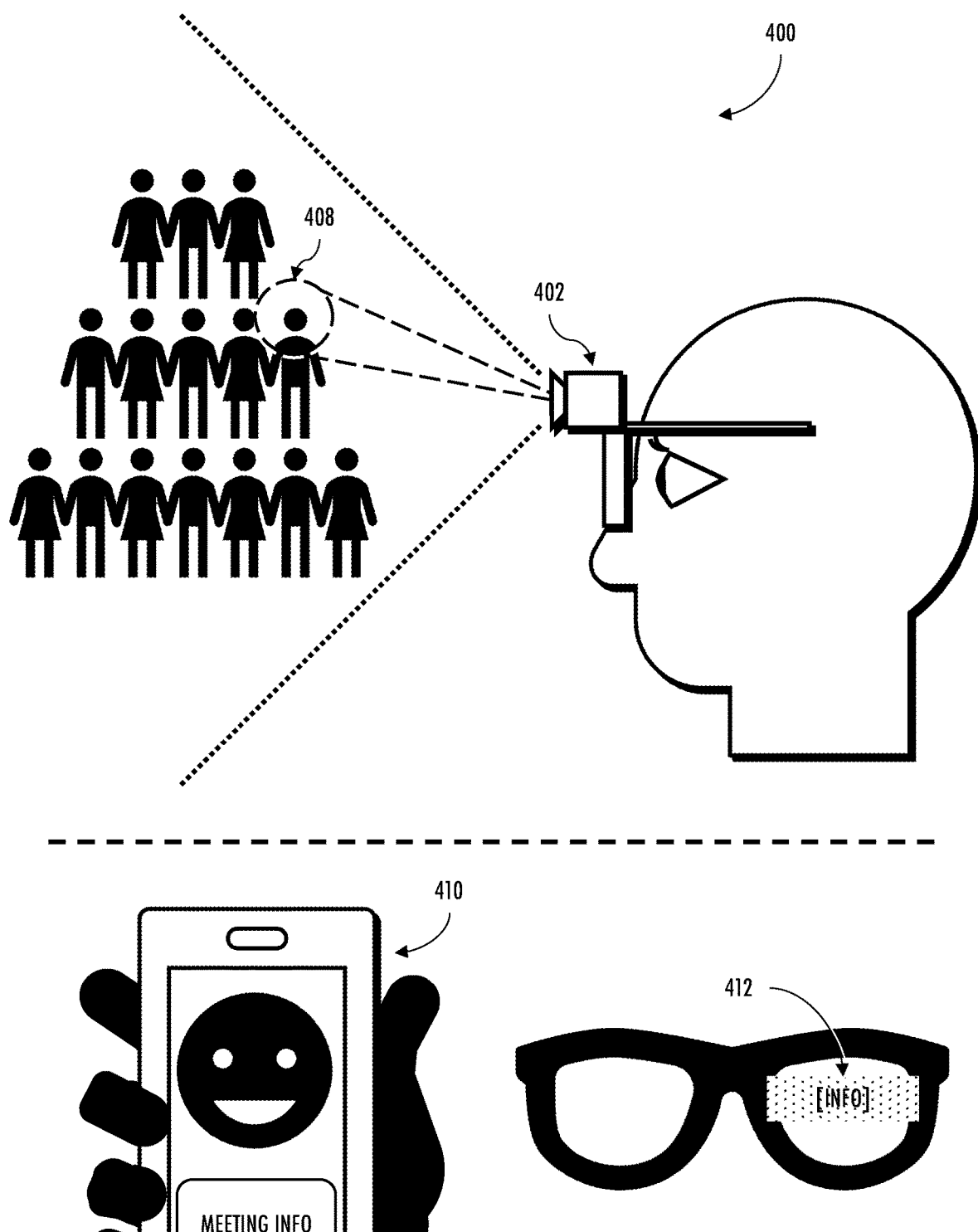
FIG. 4 is a graphical representation of a corporate net-working scenario, useful in accordance with the various aspects of the present disclosure.

Consider the scenario 400 depicted in FIG. 4 where a user attends a networking event. In preparation for the networking event, the user has planned several meetings with other conference attendees. The conference attendees may be an existing contact for the user and/or may have provided the user with their profile information via an e-business card, or similar data structure. This information may be locally stored on the user's companion device 410, or the conference organizer's database.

Prior to a planned meeting, the user's smart glasses may be pre-seeded with the faceprint of the other conference attendee. This allows the smart glasses to do targeted facial recognition matches against the expected faceprint at greatly reduced complexity. In some cases, this functionality may also be combined with real-time location tracking services such that e.g., the smart glasses are only pre-seeded once the other conference attendee is within a few hundred feet of the user and/or a few minutes before the scheduled meeting.

Shortly before the scheduled meeting, the smart glasses notify the user of an upcoming meeting with the other conference attendee. Concurrently, the smart glasses start to scan for targeted facial recognition matches, using the wide or ultra-wide angle FOV camera 402. In some cases, the scan may also incorporate telephoto cameras and/or 360° cameras. In one exemplary embodiment, the smart glasses scan any newly detected faces against faceprint of the target conference attendee using targeted facial recognition.

Once a successful match has been found, the smart glasses notify the user of the successful match and may visually identify the person-of-interest (POI) 408 e.g., via a heads-up display (HUD) 412. In other embodiments, the glasses may merely instruct the user to turn their head left-right, up-down (e.g., arrow LEDs, or similar signaling), or haptic vibration frequency (faster frequencies indicate closer proximity). Still other variants may display a cropped version of the POI 408 and allow the user to scan the crowd of conference attendees and/or navigate the user to a meet-up location.

Once the user and the other conference attendee are in proximity, wireless communications (e.g., Bluetooth, Wi-Fi) may be used to create an ad hoc data connection to e.g., transfer important data and/or provide meeting information (e.g., meeting agenda, contact information, etc.).

While the foregoing example is presented within the context of pre-seeded faceprint data, artisans of ordinary skill in the related arts will readily appreciate that database assisted implementations may also efficiently provide or process faceprint information on an as-requested basis. For example, a user might strike up a conversation with another arbitrary conference attendee. In this case, the smart glasses may take a high-resolution image and crop to the other attendee's face. Since the faceprint is new (not matched to any previously known contact), the smart glasses may query the conference servers for potential matches of the faceprint. Once a successful match has occurred, the user and the other conference attendee may create an ad hoc data connection to transfer information.

More directly, unlike most facial detection/facial recognition applications which operate on image data directly, the database assisted implementation may leverage the smart glasses' earlier operations. In other words, the glasses can perform a first iteration of feature extraction (faceprint data). Even though the smart glasses do not have the onboard library to successfully match the faceprint, the extracted features may be provided to a companion device or the nearby corporate infrastructure to perform additional iterations and/or refinements. Here, the faceprint data may be even smaller than ROI data. Other smart glass variants may transfer the cropped ROI, the originally captured high-resolution image, and/or any other relevant metadata (location, time, etc.).

Additionally, while the foregoing discussion is presented in the context of visual information, other sensing modalities may be used to augment (or even replace) visual information with equal success. For example, within the context of a closed infrastructure, localization services may allow smart glasses to operate almost entirely on location data. Notably, location services generally take less power than visual processing. In addition to location services, the glasses may use IMU data (inertial measurement unit), optical flow, and/or change detection to further reduce the amount and/or complexity of vision processing. In other words, the smart glasses only need to transfer faceprint and/or image data for new faces, significant movement, etc.

In some cases, the smart glasses may also perform in-device quality assessments to minimize back-and-forth queries. For example, the smart glasses may selectively capture multiple images/audio waveforms, selecting only the best data (e.g., clear facial features, unobstructed images, little ambient noise, etc.) to transmit. More directly, it may be more efficient to query once with the best available faceprint, rather than multiple query attempts with poor quality faceprints. Similar checks may be performed at the companion device to ensure that the faceprints generated by the smart glasses are acceptable for future reference.

Notable Use Case: Cataloging Salient Events

While memory is not a "sense", it is closely related to perception. For example, a user might want to remember the faces of people they meet throughout a day. Unfortunately, continuously recording and processing visual data is very power intensive, even at very low resolutions. Additionally, most image data has relatively low "recall value" to the user. For example, 30 minutes of video at 30 fps would yield over 50,000 images. Yet only one or two images might be enough to remind a person of a 30-minute conversation. More directly, a user doesn't need a full video record of all the people they met throughout their day; instead, one or two images of a notable face at a certain distance, size, resolution, lighting, might be sufficient. To these ends, various embodiments of the present disclosure monitor for salient events based on low power sensory modalities and/or computer-vision processing. When certain conditions are met, the smart glasses take a snapshot of the event for later review.

Consider a scenario where a user encounters a friend and has a conversation. Most memorable encounters are likely to be within a conversational distance. Conversational distances vary by culture; in the United States, most people are comfortable with about 2-3 feet of space. At these ranges, the smart glasses may be triggered based on audio input; for example, the smart glasses may monitor when the user speaks to determine when a conversation starts. Using audio rather than images greatly reduces processing complexity and may significantly reduce power consumption during uninteresting activity. Other variants might be triggered by proximity sensors, a scheduled meeting, etc.

Once a conversation has started, the smart glasses may periodically capture a low-resolution image to perform facial detection; this low-resolution capture allows the smart glasses to screen for better opportunities to capture a high-resolution image for facial recognition. At this range, wide angle camera lenses (or even ultra-wide camera lenses) may be used to track the location of the face relative to the user. In some cases, the capture moment may be at an off-angle from the user's perspective; thus, some variants may correct for barrel (fisheye)/perspective, etc. Once a high-resolution image is captured, the facial detection information may be used to crop to an ROI for facial recognition (via onboard processing or companion device processing).

If facial recognition succeeds, then further vision processing may be greatly reduced and/or ignored altogether. Depending on user configuration, the smart glasses may catalog the meeting using text (or other data structure). In other cases, the smart glasses may attempt to capture a photographic record. Such implementations may expressly prompt the user to memorialize the encounter with a framed shot. Other implementations may use facial detection (facial recognition may be unnecessary) to track the relative size and location of the friend's face. This may be used to automatically trigger a high-resolution capture when their face is well-sized, well-lit, slow/no movement, and unobscured (good capture conditions). In some variants, feature extraction may further consider notable expressions (joy, surprise, sadness, etc.) of either or both user and their friend. Once a suitable quality image is captured, the smart glasses can monitor much less frequently (thus saving power) until another salient event occurs.

If facial recognition does not identify a match, then the smart glasses may treat the person as a new contact. Here, the smart glasses may use facial detection to track the size and location of the new contact's face. Under good capture conditions (well-sized, well-lit, slow/no movement, unobscured), the smart glasses capture a high-resolution image to create a new faceprint. The high-resolution image may additionally be cropped to a region-of-interest (ROI) and used as the new contact's profile picture. Here, the smart glasses uses facial detection information to identify when the captured image is of sufficiently high quality before performing further faceprint processing; this further minimizes unnecessary processing.

While the foregoing example is presented in the context of two people meeting, the concepts are broadly applicable to group settings where multiple people can enter and join a conversation (or exit a conversation) at varying times. In some cases, the same conversational event may be demarcated by multiple entrances and/or exits. In other cases, the conversational event may be treated as multiple individual conversational events.

Furthermore, while the foregoing example is presented in the context of a conversation, the techniques may be broadly construed to include any identifiable salient event. As another such example, a user might want to catalog scenic stops on a road trip-here, the salient event might be breaks in motion which occur at vista points. Or, alternatively, the smart glasses may detect when the user is looking out of their window, and sample the scenery at long intervals (e.g., every 5, 10, 15 minutes, etc.). In some cases, only significant changes in scenery (measured by coloration/lighting, etc.) may be retained and cataloged. In other words, rather than trying to capture many images which have limited utility, the smart glasses attempts to identify one or more salient event(s) that are broadly representative of a larger interaction. Various other sensory modalities may be substituted with equal success—e.g., audio variants may use computer assisted analysis to pick out interesting conversations, music, etc.

System Architecture

Figure 5:
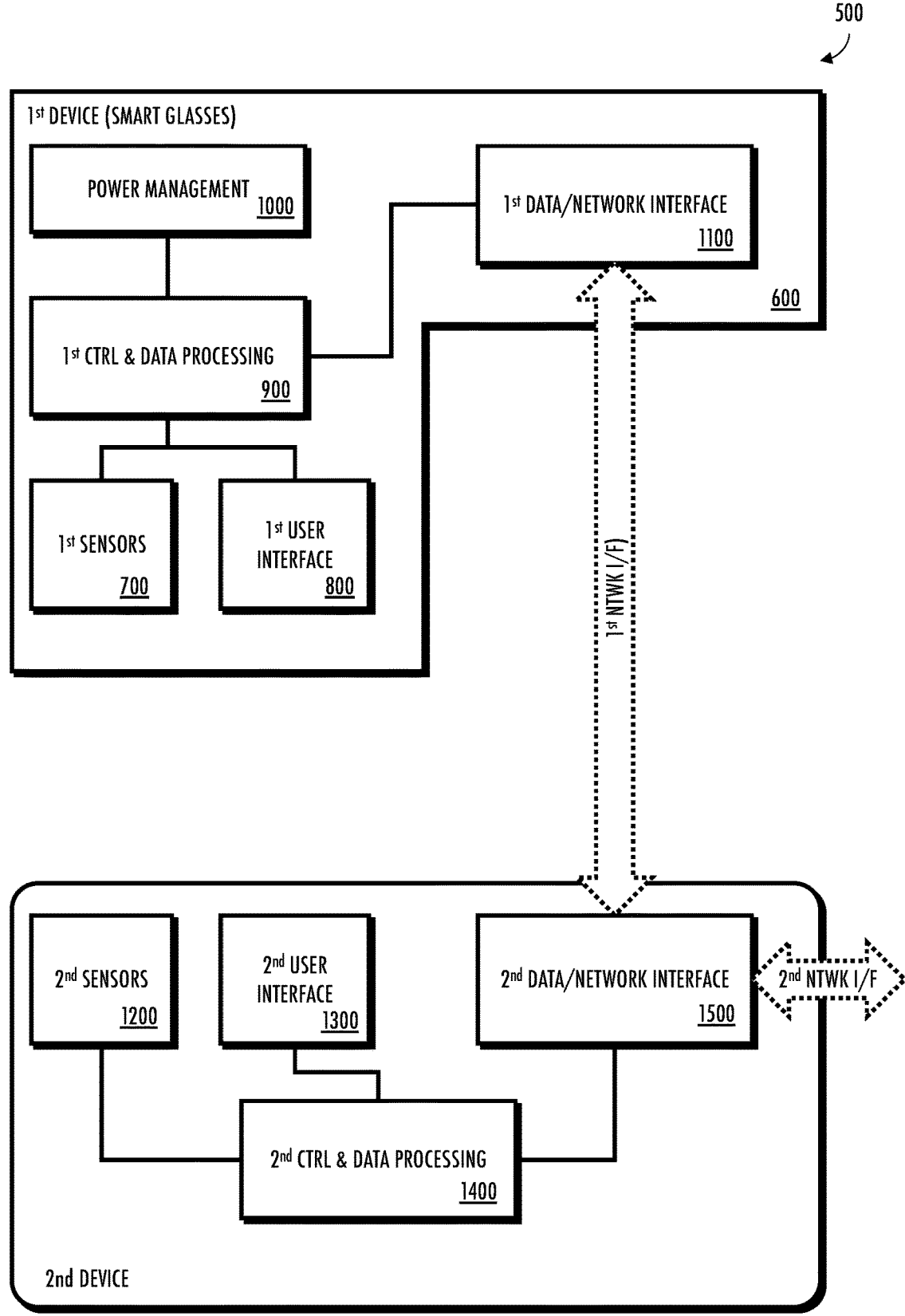
FIG. 5 is a logical block diagram of the exemplary sensory augmentation system, in accordance with various aspects of the present disclosure.

FIG. 5 is a logical block diagram of the exemplary sensory augmentation system 500. The system 500 includes a first device such as a smart glasses device. The first device may include a physical frame 600, a first sensor subsystem 700, a first user interface subsystem 800, a first control and data processing logic 900, a power management subsystem 1000, and a first data/network interface 1100. In some applications, the system may additionally include a second device such as a smart phone, laptop, or other companion device. The second device may include a second sensor subsystem 1200, a second user interface subsystem 1300, a second control and data processing logic 1400, and a second data/network interface 1500.

Referring now to the first device, the physical frame 600 attaches the first device to the user's head. The first sensor interface subsystem 700 monitors the user for user interactions and captures data from the environment. The first user interface subsystem 800 renders data for user consumption. The first control and data processing logic 900 obtains data generated by the user, other devices, and/or captured from the environment, to perform calculations and/or data manipulations. The resulting data may be stored, rendered to the user, transmitted to another party, or otherwise used by the first device to carry out its tasks. The power management subsystem 1000 supplies and controls power for the first device components. The first data/network interface 1100 converts data for transmission to another device via removeable storage media or some other transmission medium.

In some cases, the first device may communicate and/or coordinate actions with the second device. The second device may be handheld, mobile, stationary, or otherwise independently manipulated by the user. The second sensor interface subsystem 1200 monitors the second device for user interactions and captures data from the environment. The second user interface subsystem 1300 renders data for user consumption. The second control and data processing logic 1400 obtains data generated by the user, other devices, and/or captured from the environment, to perform calculations and/or data manipulations. The resulting data may be stored, rendered to the user, transmitted to another party, or otherwise used by the first device to carry out its tasks. The second data/network logic 1500 converts data for transmission to another device via removeable storage media or some other transmission medium. In some cases, the first data/network logic 1100 and second data/network logic 1500 may be in operative communication with one another.

The various logical subsystems described above may be logically combined, divided, hybridized, and/or augmented within various physical components of the first device and/or the second device. As but one such example, an eye-tracking camera and forward-facing camera may be implemented as separate, or combined, physical assemblies. As another example, power management may be centralized within a single component or distributed among many different components; similarly, data processing logic may occur in multiple components of the system. More generally, the logical block diagram illustrates the various functional components of the system, which may be physically implemented in a variety of different manners.

While the present discussion describes region-of-interest (ROI) processing that can be used to augment a user's natural senses, the system may have broad applicability to any sensory augmentation apparatus. Such applications may include stationary and/or mobile applications. For example, region-of-interest (ROI) processing may allow for long-distance vision assistance in cars, or parking assistance with 360° environmental cameras. This may be particularly useful to provide a cropped ROI of a traffic condition far ahead (or a cropped ROI of an imminent slow-speed collision, etc.) to the user in the vehicle HUD during operation.

Additionally, while smart glasses primarily use camera and display components to capture and display visual data, other interface components may enable audio data, haptic data, inertial measurements, and/or "rumble box" type data. More generally, the techniques described throughout are applicable to any sensory modality.

The following discussion provides functional descriptions for each of the logical entities of the exemplary system. Artisans of ordinary skill in the related arts will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary system 500 is separately provided below.

Functional Overview of the Physical Frame

A "physical frame" or a "frame" refers to any physical structure or combination of structures that holds the components of a sensory augmentation device within a fixed location relative to the user's head. While the present disclosure is described in the context of eyewear frames, artisans of ordinary skill in the related arts will readily appreciate that the techniques may be extended to any form of headwear including without limitation: hats, visors, helmets, goggles, and/or headsets. In fact, a physical frame may not hold the user's head at all; the frame may be based on a relatively fixed head positioning determined from a known body position and/or intended use scenario—for example, a heads-up display in a smart car may be trained for the driver's head positioning (or passenger's positioning) to allow for sensory augmentation e.g., during driver operation, etc. As another such example, the components might be mounted-in, or distributed across, other accessories (e.g., necklaces, earrings, hairclips, etc.) that have a relatively fixed positioning relative to the user's head and torso.

As used herein, the term "hands-free" refers to operation of the device without requiring physical contact between the frame and its components, and the user's hands. Examples of physical contact (which are unnecessary during hands-free operation) may include e.g., button presses, physical taps, capacitive sensing, etc.

Physical Frame, Implementation and Design Considerations

Figure 6:
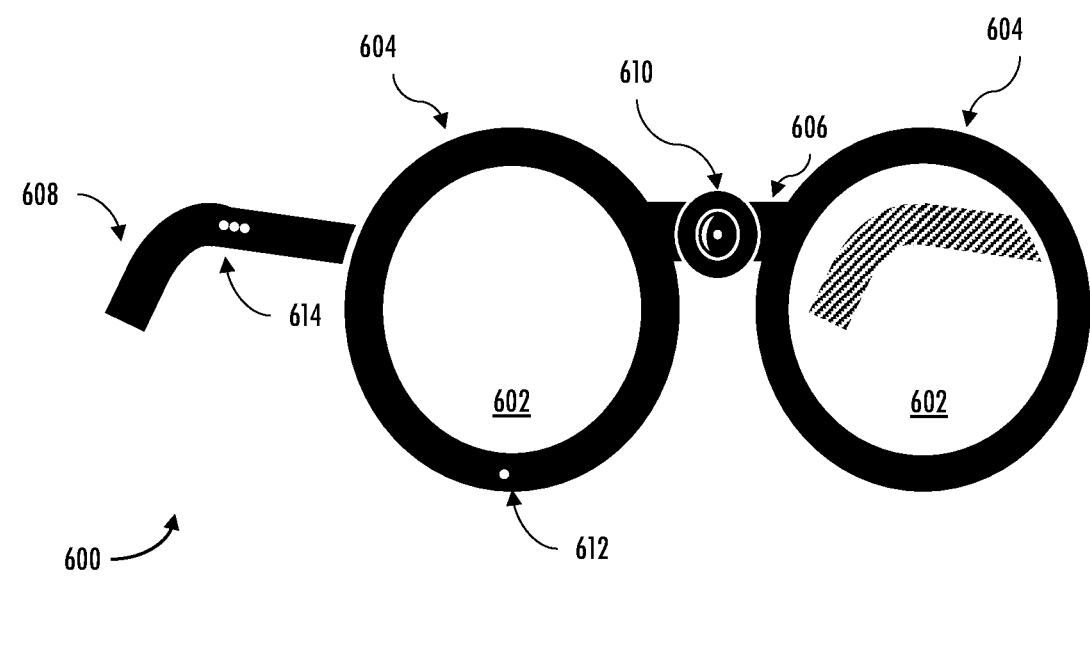
FIG. 6 is a graphical representation of a physical frame, useful in conjunction with various aspects of the present disclosure.
Figure 6:
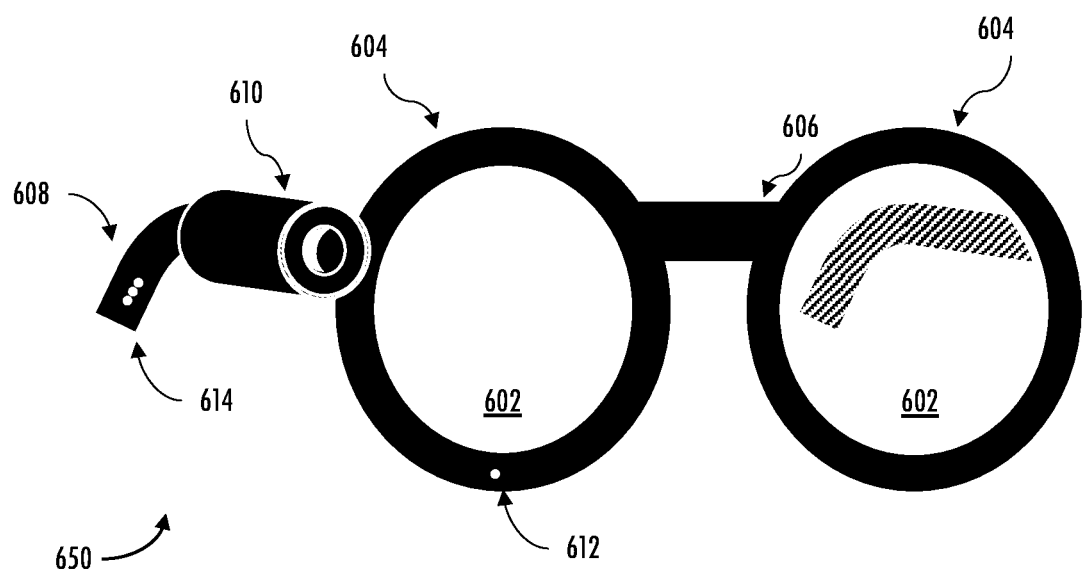

As shown in FIG. 6, the physical frame may be implemented as eyeglass frames that include one or more lenses 602 housed in rims 604 that are connected by a bridge 606. The bridge 606 rests on the user's nose, and two arms 608 rest on the user's ears. The frame may hold the various operational components of the smart glasses (e.g., camera(s) 610, microphone(s) 612, and speaker(s) 614) in fixed locations relative to the user's sense/vocal organs (eyes, ears, mouth).

Physical frames may be manufactured in a variety of frame types, materials, and/or shapes. Common frame types include full-rimmed, semi-rimless, rimless, wire, and/or custom bridge (low bridge, high bridge). Full-rimmed glasses have rims that cover the full circumference of the lenses, semi-rimmed have some portion of the lens that expose an edge of the lenses, and rimless/wire glasses do not have any rim around the lenses. Some humans have differently shaped facial features; typically, custom bridge frames are designed to prevent glasses from slipping down certain types of noses. Common frame materials include plastic, acetate, wood, and metals (aluminum, stainless steel, titanium, silver, gold, etc.), and/or combinations of the foregoing. Common shapes include rectangle, oval, round, square, large, horn, brow-line, aviator, cat-eye, oversized and/or geometric shapes.

Larger and more substantial frames and materials may provide stability and/or support for mounting the various components of the device. For example, full-rimmed glasses may support a forward-facing and eye-tracking camera as well as speakers and/or microphone components, etc. Semi-rimmed and rimless/wire form factors may be lighter and/or more comfortable but may limit the capabilities of the glasses—e.g., only a limited resolution forward-facing camera to capture user hand gestures, etc. Similarly, custom bridge frames may provide more stability near the nose; this may be desirable for e.g., a more robust forward-facing camera. Material selection and/or frame types may also have functional considerations for smart glass operation; for example, plastics and woods are insulators and can manage thermal heat well, whereas metals may offer a higher strength to weight ratio.

As a practical matter, the physical frame may have a variety of "wearability" considerations e.g., thermal dissipation, device weight, battery life, etc. Some physical frame effects may be implicitly selected—for by the user. For example, even though customers often consider the physical frame to be a matter of personal style, the new capabilities described throughout may enable active functions that affect a user's experience; in some cases, this may influence the customer to make different selections compared to their non-smart eyewear, or to purchase multiple different smart glasses for different usages. Other physical frame effects may be adjusted based on user-to-frame metadata. In some cases, the user-to-frame metadata may be generated from user-specific calibration, training, and/or user configuration—in some cases, the user-to-frame metadata may be stored in data structures or "profiles". User-to-frame profiles may be useful to e.g., migrate training between different physical frames, ensure consistent usage experience across different frames, etc.

In one exemplary embodiment, the physical frame may center the camera assembly within the bridge 606, between the user's eyes (e.g., physical frame 600). A centered placement provides a perspective view that more closely matches the user's natural perspective. However, this may present issues for certain types of lenses which have a long focal length (e.g., telephoto lenses, etc.). In some embodiments, the physical frame may use a "periscope" prism to divert light perpendicular to the capture direction. Periscope prisms insert an additional optical element in the lens assembly and may increase manufacturing costs and/or reduce image quality. In still other embodiments, the camera assembly may be mounted along one or both arms 608 (see e.g., physical frame 650). Offset placements allow for a much longer focal length but may induce parallax effects.

More generally, sensory augmentation may affect the physical form factor of the smart glasses. While the foregoing examples are presented in the context of visual augmentation with camera assemblies of different focal length, other forms of sensory augmentation may be substituted with equal success. For example, audio variants may use the frame to support an array of distributed microphones for beamforming, etc. In some cases, the frames may also include directional structures to focus acoustic waves toward the microphones.

Functional Overview of the Sensor Subsystem

A "sensor" refers to any electrical and/or mechanical structure that measures, and records, parameters of the physical environment as analog or digital data. Most consumer electronics devices incorporate multiple different modalities of sensor data; for example, visual data may be captured as images and/or video, audible data may be captured as audio waveforms (or their frequency representations), inertial measurements may be captured as quaternions, Euler angles, or other coordinate-based representations.

While the present disclosure is described in the context of audio data, visual data, and/or IMU data, artisans of ordinary skill in the related arts will readily appreciate that the raw data, metadata, and/or any derived data may be substituted with equal success. For example, an image may be provided along with metadata about the image (e.g., facial coordinates, object coordinates, depth maps, etc.). Post-processing may also yield derived data from raw image data; for example, a neural network may process an image and derive one or more activations (data packets that identify a location of a "spike" activation within the neural network).

Sensor Subsystem, Implementation and Design Considerations

Figure 7:
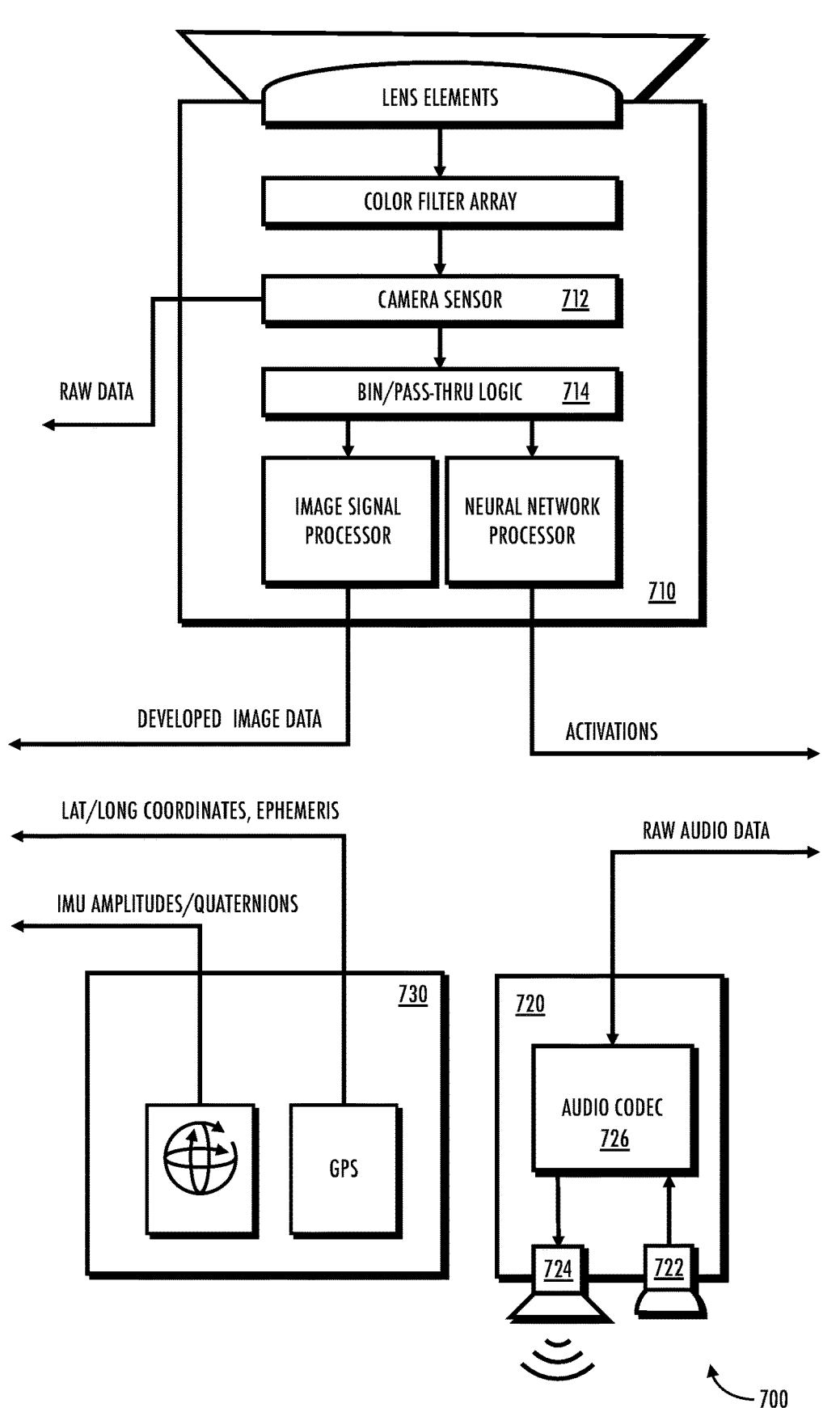
FIG. 7 is a logical block diagram of the various sensors of the sensor subsystem, useful in conjunction with various aspects of the present disclosure.

FIG. 7 is a logical block diagram of the various sensors of the sensor subsystem 700 (and, if a second device is present, sensor subsystem 1200). The sensor subsystem 700 may include: one or more camera sensor(s) 710, an audio module 720, an accelerometer/gyroscope/magnetometer 730 (also referred to as an inertial measurement unit (IMU)), a display module (not shown), and/or Global Positioning System (GPS) system (not shown). In some embodiments, the sensor subsystem 700 is an integral part of the first device. In other embodiments, the sensor subsystem 700 may be augmented by the sensor subsystem 1200 of the second device and/or removably attached components (e.g., smart phones, after market sensors, etc.) The following sections provide detailed descriptions of the individual components of the sensor subsystem 700 and/or sensor subsystem 1200.
Camera Module A camera lens bends (distorts) light to focus on the camera sensor 712. In one specific implementation, the camera sensor 712 senses light (luminance) via photoelectric sensors (e.g., photosites). A color filter array (CFA) value provides a color (chrominance) that is associated with each sensor. The combination of each luminance and chrominance value provides a mosaic of discrete red, green, blue value/positions, that may be "demosaiced" to recover a numeric tuple (RGB, CMYK, YUV, YCrCb, etc.) for each pixel of an image. Notably, most imaging formats are defined for the human visual spectrum; however, machine vision may use other variants of light. For example, a computer vision camera might operate on direct raw data from the image sensor with a RCCC (Red Clear Clear Clear) color filter array that provides a higher light intensity than the RGB color filter array used in media application cameras.

In some embodiments, the camera resolution directly corresponds to light information. In other words, the Bayer sensor may match one pixel to a color and light intensity (each pixel corresponds to a photosite). However, in some embodiments, the camera resolution does not directly correspond to light information. Some high-resolution cameras use an N-Bayer sensor that groups four, or even nine, pixels per photosite. During image signal processing, color information is re-distributed across the pixels with a technique called "pixel binning" (see bin/pass-thru logic 714). Pixel-binning provides better results and versatility than just interpolation/upscaling. For example, a camera can capture high resolution images (e.g., 108 MPixels) in full-light; but in low-light conditions, the camera can emulate a much larger photosite with the same sensor (e.g., grouping pixels in sets of 9 to get a 12 MPixel "nona-binned" resolution). Unfortunately, cramming photosites together can result in "leaks" of light between adjacent pixels (i.e., sensor noise). In other words, smaller sensors and small photosites increase noise and decrease dynamic range.

During operation, the first device may make use of multiple camera systems to assess user interactions and the physical environment. In one exemplary embodiment, the smart glasses may have one or more forward-facing cameras to capture the user's visual field. In some cases, multiple forward-facing cameras can be used to capture different fields-of-view and/or ranges. For example, a medium range camera might have a horizontal field of view (FOV) of 70°-120° whereas long range cameras may use a FOV of 35°, or less, and have multiple aperture settings. In some cases, a "wide" FOV camera (so-called fisheye lenses provide between 120° and 195°) may be used to capture periphery information.

More generally, however, any camera lens or set of camera lenses may be substituted with equal success for any of the foregoing tasks; including e.g., narrow field-of-view (10° to 90°) and/or stitched variants (e.g., 360° panoramas). While the foregoing techniques are described in the context of perceptible light, the techniques may be applied to other electromagnetic (EM) radiation capture and focus apparatus including without limitation: infrared, ultraviolet, and/or X-ray, etc.

In some embodiments, the camera sensor(s) 710 may include on-board image signal processing and/or neural network processing. On-board processing may be implemented within the same silicon or on a stacked silicon die (within the same package/module). Silicon and stacked variants reduce power consumption relative to discrete component alternatives that must be connected via external wiring, etc. Processing functionality is discussed elsewhere (see e.g., Control and Data) Subsystem, further below).
Audio Module The audio module 720 typically incorporates a microphone 722, speaker 724, and an audio codec 726. The microphone senses acoustic vibrations and converts the vibrations to an electrical signal (via a transducer, condenser, etc.). The electrical signal is provided to the audio codec, which samples the electrical signal and converts the time domain waveform to its frequency domain representation. Typically, additional filtering and noise reduction may be performed to compensate for microphone characteristics. The resulting audio waveform may be compressed for delivery via any number of audio data formats. To generate audible sound, the audio codec 726 obtains audio data and decodes the data into an electrical signal. The electrical signal can be amplified and used to drive the speaker 724 to generate acoustic waves.

Commodity audio codecs generally fall into speech codecs and full spectrum codecs. Full spectrum codecs use the modified discrete cosine transform (mDCT) and/or mel-frequency cepstral coefficients (MFCC) to represent the full audible spectrum. Speech codecs reduce coding complexity by leveraging the characteristics of the human auditory/speech system to mimic voice communications. Speech codecs often make significant trade-offs to preserve intelligibility, pleasantness, and/or data transmission considerations (robustness, latency, bandwidth, etc.)

While the illustrated audio module 720 depicts a single microphone and speaker, an audio module may have any number of microphones and/or speakers. For example, multiple speakers may be used to generate stereo sound and multiple microphones may be used to capture stereo sound. More broadly, any number of individual microphones and/or speakers can be used to constructively and/or destructively combine acoustic waves (also referred to as beamforming).

In some embodiments, the audio module 720 may include on-board audio processing and/or neural network processing to assist with voice analysis and synthesis. These functions are discussed elsewhere (see e.g., Cor Data Subsystem, further below).
Inertial Measurement Unit and Positioning The inertial measurement unit (IMU) 730 includes one or more accelerometers, gyroscopes, and/or magnetometers. Typically, an accelerometer uses a damped mass and spring assembly to measure proper acceleration (i.e., acceleration in its own instantaneous rest frame). In many cases, accelerometers may have a variable frequency response. Most gyroscopes use a rotating mass to measure angular velocity; a MEMS (microelectromechanical) gyroscope may use a pendulum mass to achieve a similar effect by measuring the pendulum's perturbations. Most magnetometers use a ferromagnetic element to measure the vector and strength of a magnetic field; other magnetometers may rely on induced currents and/or pickup coils. The IMU uses the acceleration, angular velocity, and/or magnetic information to calculate quaternions that define the relative motion of an object in four-dimensional (4D) space. Quaternions can be efficiently computed to determine velocity (both head direction and speed).

More generally, however, any scheme for detecting user velocity (direction and speed) may be substituted with equal success for any of the foregoing tasks. Other useful information may include pedometer and/or compass measurements. While the foregoing techniques are described in the context of an inertial measurement unit (IMU) that provides quaternion vectors, artisans of ordinary skill in the related arts will readily appreciate that raw data (acceleration, rotation, magnetic field) and any of their derivatives may be substituted with equal success.

Global Positioning System (GPS) is a satellite-based radio navigation system that allows a user device to triangulate its location anywhere in the world. Each GPS satellite carries very stable atomic clocks that are synchronized with one another and with ground clocks. Any drift from time maintained on the ground is corrected daily. In the same manner, the satellite locations are known with great precision. The satellites continuously broadcast their current position. During operation, GPS receivers attempt to demodulate GPS satellite broadcasts. Since the speed of radio waves is constant and independent of the satellite speed, the time delay between when the satellite transmits a signal and the receiver receives it is proportional to the distance from the satellite to the receiver. Once received, a GPS receiver can triangulate its own four-dimensional position in spacetime based on data received from multiple GPS satellites. At a minimum, four satellites must be in view of the receiver for it to compute four unknown quantities (three position coordinates and the deviation of its own clock from satellite time). In so-called "assisted GPS" implementations, ephemeris data may be downloaded from cellular networks to reduce processing complexity (e.g., the receiver can reduce its search window).

In one exemplary embodiment, GPS and/or route information may be used to identify the geographic area that a user has traveled in and/or will pass through. In some cases, this may allow for better predictions as to the current user context (e.g., at home, at work, at the gym, etc.).

In some embodiments, the IMU 730 may include on-board telemetry processing and/or neural network processing to assist with telemetry analysis and synthesis. These functions are discussed elsewhere (see e.g., Control and Data Subsystem, further below).

Functional Overview of the User Interface Subsystem

Functionally, the "user interface" refers to the physical and logical components of the system that interact with the human user. A "physical" user interface refers to electrical and/or mechanical devices that the user physically interacts with. An "augmented reality" user interface refers to a user interface that incorporates an artificial environment that has been overlaid on the user's physical environment. A "virtual reality" user interface refers to a user interface that is entirely constrained within a "virtualized" artificial environment. An "extended reality" user interface refers to any user interface that lies in the spectrum from physical user interfaces to virtual user interfaces.

User Interface Subsystem, Implementation and Design Considerations

The user interface subsystem encompasses the visual, audio, and tactile elements of the device that enable a user to interact with it. In addition to physical user interface devices that use physical buttons, switches, and/or sliders to register explicit user input, the user interface subsystem 800 may also incorporate various components of the sensor subsystem 700 to sense user interactions. For example, the user interface may include: a display module to present information, eye-tracking camera sensor(s) to monitor gaze fixation, hand-tracking camera sensor(s) to monitor for hand gestures, a speaker to provide audible information, and a microphone to capture voice commands, etc.

Display Module

The display module (not shown) is an output device for presentation of information in a visual form. Different display configurations may internalize or externalize the display components within the lens. For example, some implementations embed optics or waveguides within the lens and externalize the display as a nearby projector or micro-LEDs. As another such example, there are displays that project images into the eyes.

In one exemplary embodiment, the display module may be incorporated within the device as a display that is overlaps the user's visual field. Examples of such implementations may include so-called "heads up displays" (HUDs) that are integrated within the lenses, or projection/reflection type displays that use the lens components as a display area. Existing integrated display sizes are typically limited to the lens form factor, and thus resolutions may be smaller than handheld devices e.g., 640×320, 1280×640, 1980×1280, etc. For comparison, handheld device resolutions that exceed 2560×1280 are not unusual for smart phones, and tablets can often provide 4K UHD (3840×2160) or better. In some embodiments, the display module may be external to the glasses and remotely managed by the device (e.g., screen casting). For example, the smart glasses can encode a video stream that is sent to a user's smart phone or tablet for display.

The display module may be used where the smart glasses present and provide interaction with text, pictures, and/or AR/XR objects. For example, the AR/XR object may be a virtual keyboard and a virtual mouse. During such operation, the user may invoke a command (e.g., a hand gesture) that causes the smart glasses to present the virtual keyboard for typing by the user. The virtual keyboard is provided by presenting images on the smart glasses such that the user may type without contact to a physical object. One of skill in the art will appreciate that the virtual keyboard (and/or mouse) may be displayed as an overlay on a physical object such as a desk such that the user is technically touching a real-world object, that is, however, not a physical keyboard and/or a physical mouse.

Eye-Tracking and Hand-Tracking Modules

The user interface subsystem may incorporate an "eye-tracking" camera to monitor for gaze fixation (a user interaction event) by tracking saccadic or microsaccadic eye movements. Eye-tracking embodiments may greatly simplify camera operation since the eye-tracking data is primarily captured for standby operation (discussed below). In addition, the smart glasses may incorporate "hand-tracking" or gesture-based inputs. Gesture-based inputs and user interactions are more broadly described within e.g., U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", and U.S. patent application Ser. No. 18/061,257 filed Dec. 2, 2022, and entitled "SYSTEMS, APPARATUS, AND METHODS FOR GESTURE-BASED AUGMENTED REALITY, EXTENDED REALITY", previously incorporated by reference in their entireties.

While the present discussion describes eye-tracking and hand-tracking cameras, the techniques are broadly applicable to any outward-facing and inward-facing cameras. As used herein, the term "outward-facing" refers to cameras that capture the surroundings of a user and/or the user's relation relative to the surroundings. For example, a rear outward-facing camera could be used to capture the surroundings behind the user. Such configurations may be useful for gaming applications and/or simultaneous localization and mapping (SLAM-based) applications. As used herein, the term "inward-facing" refers to cameras that capture the user e.g., to infer user interactions, etc.

Voice Control and Audio Speaker Modules

The user interface subsystem may incorporate microphones to collect the user's vocal instructions as well as the environmental sounds. As previously noted above, the audio module may include on-board audio processing and/or neural network processing to assist with voice analysis and synthesis.

The user interface subsystem may also incorporate speakers to reproduce audio waveforms. In some cases, the speakers may incorporate noise reduction technologies and/or active noise cancelling to cancel out external sounds, creating a quieter listening environment for the user. This may be particularly useful for sensory augmentation in noisy environments, etc.

Functional Overview of the Control and Data Processing Subsystem

Functionally, the control and data subsystem controls the operation of a device and stores and processes data. Logically, the control and data subsystem may be subdivided into a "control path" and a "data path." The data path is responsible for performing arithmetic and logic operations on data. The data path generally includes registers, arithmetic and logic unit (ALU), and other components that are needed to manipulate data. The data path also includes the memory and input/output (I/O) devices that are used to store and retrieve data. In contrast, the control path controls the flow of instructions and data through the subsystem. The control path usually includes a control unit, that manages a processing state machine (e.g., a program counter which keeps track of the current instruction being executed, instruction register which holds the current instruction being executed, etc.). During operation, the control path generates the signals that manipulate data path operation. The data path performs the necessary operations on the data, and the control path moves on to the next instruction, etc.

Control and Data, Implementation and Design Considerations

Figure 9:
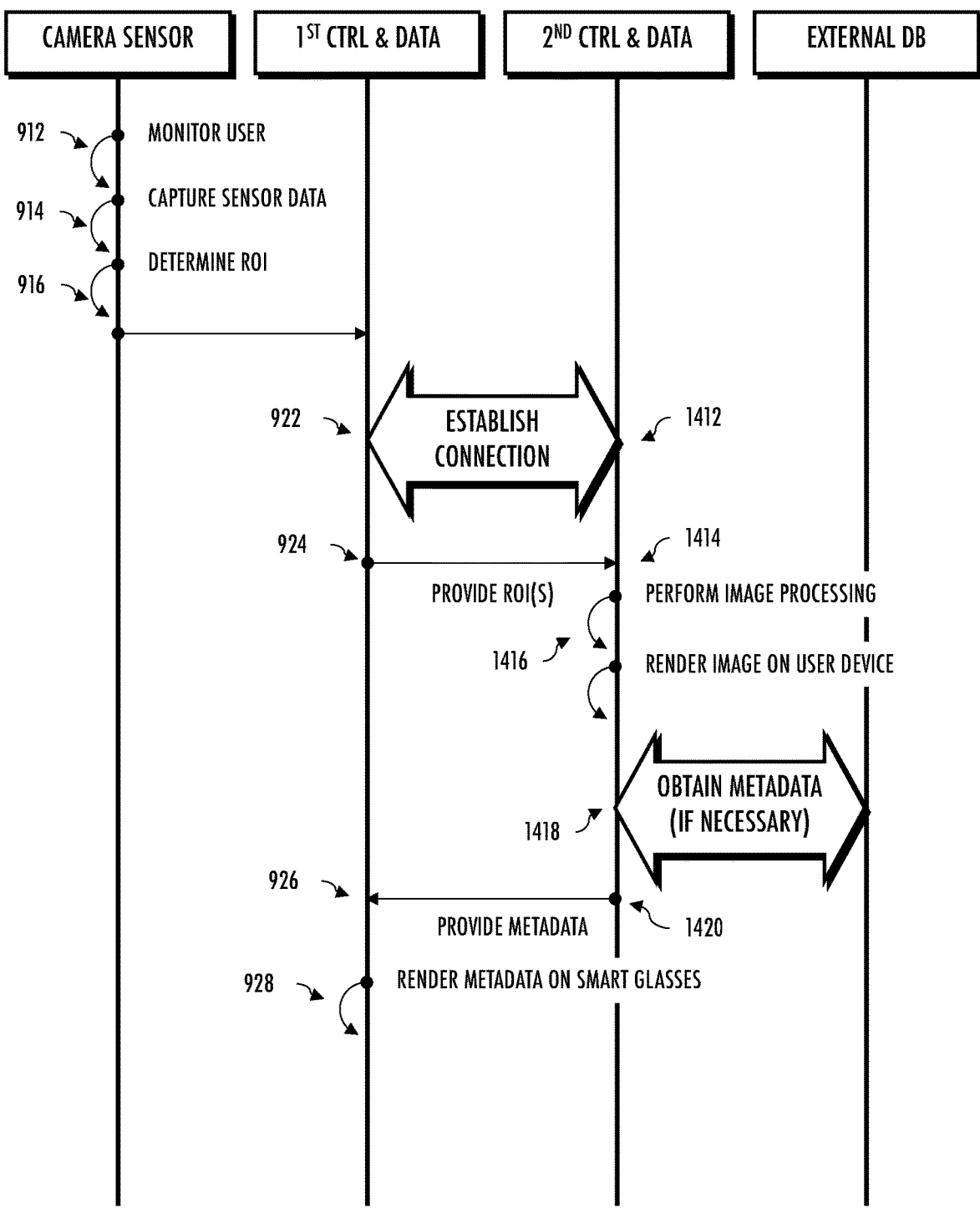
FIG. 9 depicts a ladder diagram of a chronological sequence of region-of-interest based processing, according to the logic of FIG. 8.

As shown in FIG. 9, the control and data subsystem 900 (and, if a second device is present, control and data subsystem 1400) may include one or more of: a central processing unit (CPU), an image signal processor (ISP), one or more neural network processors (NPUs), and their corresponding non-transitory computer-readable media that store program instructions and/or data. In one exemplary embodiment, the control and data subsystem includes processing units that execute instructions stored in a non-transitory computer-readable medium (memory). More generally however, other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

Processor and Memory Implementations

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU may be primarily used to control device operation and/or perform tasks of arbitrary complexity/best-effort. CPU operations may include, without limitation: operating system (OS) functionality (power management, UX), memory management, gesture-specific tasks, etc. Typically, such CPUs are selected to have relatively short pipelining, longer words (e.g., 32-bit, 64-bit, and/or super-scalar words), and/or addressable space that can access both local cache memory and/or pages of system virtual memory. More directly, a CPU may often switch between tasks, and must account for branch disruption and/or arbitrary memory access.

In contrast, the image signal processor (ISP) performs many of the same tasks repeatedly over a well-defined data structure. Specifically, the ISP maps captured camera sensor data to a color space. ISP operations often include, without limitation: demosaicing, color correction, white balance, and/or autoexposure. Most of these actions may be done with scalar vector-matrix multiplication. Raw image data has a defined size and capture rate (for video) and the ISP operations are performed identically for each pixel; as a result, ISP designs are heavily pipelined (and seldom branch), may incorporate specialized vector-matrix logic, and often rely on reduced addressable space and other task-specific optimizations. ISP designs only need to keep up with the camera sensor output to stay within the real-time budget; thus, ISPs more often benefit from larger register/data structures and do not need parallelization.

Other processor subsystem implementations may multiply, combine, further subdivide, augment, and/or subsume the foregoing functionalities within these or other processing elements. For example, multiple ISPs may be used to service multiple camera sensors. Similarly, neural network functionality (discussed below) may be subsumed with either CPU or ISP operation via software emulation.

Neural Network and Machine Learning Implementations

The device may include one or more neural network processors (NPUs). Unlike conventional "Turing"-based processor architectures (discussed above), neural network processing emulates a network of connected nodes (also known as "neurons") that loosely model the neuro-biological functionality found in the human brain. While neural network computing is still in its infancy, such technologies already have great promise for e.g., compute rich, low power, and/or continuous processing applications.

Within the context of the present disclosure, the NPUs may be used to analyze the presence of one or more user interaction(s) at varying levels of confidence. Conventional image processing techniques process the entire image data structure, an NPU may process subsets/aspects of the image data. The computational complexity may be scaled according to the stage (which corresponds to the confidence of detection.) Conceptually, neural network processing uses a collection of small nodes to loosely model the biological behavior of neurons. Each node receives inputs, and generates output, based on a neuron model (usually a rectified linear unit (ReLU), or similar). The nodes are connected to one another at "edges". Each node and edge are assigned a weight.

Each processor node of a neural network combines its inputs according to a transfer function to generate the outputs. The set of weights can be configured to amplify or dampen the constituent components of its input data. The input-weight products are summed and then the sum is passed through a node's activation function, to determine the size and magnitude of the output data. "Activated" neurons (processor nodes) generate output "activations". The activation may be fed to another node or result in an action on the environment. Coefficients may be iteratively updated with feedback to amplify inputs that are beneficial, or dampen inputs that are not.

The behavior of the neural network may be modified during an iterative training process by adjusting the node/edge weights to reduce an error gradient. The computational complexity of neural network processing is a function of the number of nodes in the network. Neural networks may be sized (and/or trained) for a variety of different considerations. For example, increasing the number of nodes may improve performance and/or robustness noise rejection whereas reducing the number of nodes may reduce power consumption and/or improve latency.

Many neural network processors emulate the individual neural network nodes as software threads, and large vector-matrix multiply accumulates. A "thread" is the smallest discrete unit of processor utilization that may be scheduled for a core to execute. A thread is characterized by: (i) a set of instructions that is executed by a processor, (ii) a program counter that identifies the current point of execution for the thread, (iii) a stack data structure that temporarily stores thread data, and (iv) registers for storing arguments of opcode execution. Other implementations may use hardware or dedicated logic to implement processor node logic, however neural network processing is still in its infancy (circa 2022) and has not yet become a commoditized semiconductor technology.

As used herein, the term "emulate" and its linguistic derivatives refers to software processes that reproduce the function of an entity based on a processing description. For example, a processor node of a machine learning algorithm may be emulated with "state inputs", and a "transfer function", that generate an "action."

Unlike the Turing-based processor architectures, machine learning algorithms learn a task that is not explicitly described with instructions. In other words, machine learning algorithms seek to create inferences from patterns in data using e.g., statistical models and/or analysis. The inferences may then be used to formulate predicted outputs that can be compared to actual output to generate feedback. Each iteration of inference and feedback is used to improve the underlying statistical models. Since the task is accomplished through dynamic coefficient weighting rather than explicit instructions, machine learning algorithms can change their behavior over time to e.g., improve performance, change tasks, etc.

Typically, machine learning algorithms are "trained" until their predicted outputs match the desired output (to within a threshold similarity). Training is broadly categorized into "offline" training and "online" training. Offline training models are trained once using a static library, whereas online training models are continuously trained on "live" data. Offline training allows for reliable training according to known data and is suitable for well-characterized behaviors. Furthermore, offline training on a single data set can be performed much faster and at a fixed power budget/training time, compared to online training via live data. However, online training may be necessary for applications that must change based on live data and/or where the training data is only partially-characterized/uncharacterized. Many implementations combine offline and online training to e.g., provide accurate initial performance that adjusts to system-specific considerations over time.

In some implementations, the neural network processor may be a standalone component of the system. In such implementations, the neural network processor may translate activation data (e.g., neural network node activity) into data structures that are suitable for system-wide use. Typically, such implementations use a data structure defined according to application programming interfaces (APIs) exposed by other components. Functionally, an API interface allows one program to request/provide a service to another program; while the exemplary system allows API calls between separate components, the API framework may be used with equal success within a component. For example, a system-on-a-chip (SoC) may provide the activation data and/or its associated metadata via an API. Some SoC implementations may also provide memory-mapped accessibility for direct data manipulation (e.g., via a CPU).

In some implementations, the NPU may be incorporated within a sensor (e.g., a camera sensor) to process data captured by the sensor. By coupling an NPU closely (on-die) with the sensor, the processing may be performed with lower power demand. In one aspect, the sensor processor may be designed as customized hardware that is dedicated to processing the data necessary to enable interpretation of relatively simple user interaction(s) to enable more elaborate gestures. In some cases, the sensor processor may be coupled to a memory that is configured to provide storage for the data captured and processed by the sensor. The sensor processing memory may be implemented as SRAM, MRAM, registers, or a combination thereof.

Conventional computer vision algorithms generate a post-processed image data (a 2-dimensional array of pixel data) whereas neural network vision computer vision generates activations. Neural network-based image recognition may have multiple advantages over conventional image recognition techniques. Raw image capture data (e.g., photosite values) are camera-specific i.e., the pixel values are a combination of both the photosite and color-filter array geometry. Raw image capture data cannot be directly displayed to a human as a meaningful image-instead raw image data must be "developed" into standardized display formats (e.g., JPEG, TIFF, MPEG, etc.). The developing process incurs multiple ISP image operations e.g., demosaicing, white balance, color adjustment, etc. In contrast, neural network processing can be trained to use raw image data (e.g., photosite values) as input rather than post-ISP image data (as is done with conventional image recognition techniques). Furthermore, neural network activations represent a node state within the neural network i.e., that the node has accumulated signal potential above a threshold value. If properly trained, neural networks can provide robust detection with very little power. Activation data is both much less frequent, and much more compact, compared to post-processed image/video data.

In some embodiments, an on-chip neural network processing at the sensor and can convey activations off-chip, such as is more generally described within e.g., U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", and U.S. patent application Ser. No. 18/061,257 filed Dec. 2, 2022, and entitled "SYSTEMS, APPARATUS, AND METHODS FOR GESTURE-BASED AUGMENTED REALITY, EXTENDED REALITY", previously incorporated by reference in their entireties.

As a related note, a gaze point is a "point" in space, a point/area on a 2D image, or a point/volume in 3D space, to varying degrees of accuracy. Additional processing may be necessary to determine a region-of-interest (ROI), based on the likely object that the user is interested in. Various embodiments of the present disclosure perform ROI determination within on-chip neural network processing at the sensor. In other words, rather than using conventional "pixel-by-pixel" computer vision-based algorithms within a processor, machine learning and sensor technologies are combined to provide region-of-interest (ROI) recognition based on neural network activations at the sensor components—in this manner, only the cropped ROI may be transferred across the bus, processed for objects, stored to memory, etc. Avoiding unnecessary data transfers/manipulations (and greatly reducing data size) across a system bus further reduces power requirements.

As a related tangent, various applications of the present disclosure may have particularly synergistic results from on-chip ROI-determination. For example, long focal length lenses (telephoto lenses) are extremely susceptible to small perturbations and/or variations in fit. In fact, consuming more power to perform ROI-determination on-chip at the sensor may be more efficient and result in lower power downstream compared to other alternatives (e.g., sending incorrect ROI and/or more image data.) While the foregoing discussion is presented in the context of visual data, the concepts are broadly applicable to all sensed modalities (e.g., audio, IMU, etc.). For example, rather than sending a continuous audio file, an audio processor might only send specific audio snippets, or even audio which has been pre-processed.

Other Notable Logic Implementations

Application specific integrated circuits (ASICs) and field-programmable gate arrays (FPGAs) are other "dedicated logic" technologies that can provide suitable control and data processing for a smart glasses system. These technologies are based on register-transfer logic (RTL) rather than procedural steps. In other words, RTL describes combinatorial logic, sequential gates, and their interconnections (i.e., its structure) rather than instructions for execution. While dedicated logic can enable much higher performance for mature logic (e.g., 50×+ relative to software alternatives), the structure of dedicated logic cannot be altered at run-time and is considerably less flexible than software.

Application specific integrated circuits (ASICs) directly convert RTL descriptions to combinatorial logic and sequential gates. For example, a 2-input combinatorial logic gate (AND, OR, XOR, etc.) may be implemented by physically arranging 4 transistor logic gates, a flip-flop register may be implemented with 12 transistor logic gates. ASIC layouts are physically etched and doped into silicon substrate; once created, the ASIC functionality cannot be modified. Notably, ASIC designs can be incredibly power-efficient and achieve the highest levels of performance. Unfortunately, the manufacture of ASICs is expensive and cannot be modified after fabrication—as a result, ASIC devices are usually only used in very mature (commodity) designs that compete primarily on price rather than functionality.

FPGAs are designed to be programmed "in-the-field" after manufacturing. FPGAs contain an array of look-up-table (LUT) memories (often referred to as programmable logic blocks) that can be used to emulate a logical gate. As but one such example, a 2-input LUT takes two bits of input which address 4 possible memory locations. By storing "1" into the location of 0#b'11 and setting all other locations to be "0" the 2-input LUT emulates an AND gate. Conversely, by storing "0" into the location of 0#b'00 and setting all other locations to be "1" the 2-input LUT emulates an OR gate. In other words, FPGAs implement Boolean logic as memory-any arbitrary logic may be created by interconnecting LUTs (combinatorial logic) to one another along with registers, flip-flops, and/or dedicated memory blocks. LUTs take up substantially more die space than gate-level equivalents; additionally, FPGA-based designs are often only sparsely programmed since the interconnect fabric may limit "fanout." As a practical matter, an FPGA may offer lower performance than an ASIC (but still better than software equivalents) with substantially larger die size and power consumption. FPGA solutions are often used for limited-run, high performance applications that may evolve over time.

Region-of-Interest Based Processing, Generalized Operation

In one embodiment, the control and data processing subsystem may be used to store data locally at the device. In one exemplary embodiment, data may be stored as non-transitory symbols (e.g., bits read from non-transitory computer-readable mediums). In one specific implementation, a memory subsystem including non-transitory computer-readable medium is physically realized as one or more physical memory chips (e.g., NAND/NOR flash) that are logically separated into memory data structures. The memory subsystem may be bifurcated into program code and/or program data. In some variants, program code and/or program data may be further organized for dedicated and/or collaborative use. For example, the ISP and CPU may share a common memory buffer to facilitate large transfers of data therebetween. Similarly, the codec may have a dedicated memory buffer to avoid resource contention.

In some embodiments, the program code may be statically stored within the device as firmware. In other embodiments, the program code may be dynamically stored (and changeable) via software updates. In some such variants, software may be subsequently updated by external parties and/or the user, based on various access permissions and procedures.

Figure 8:
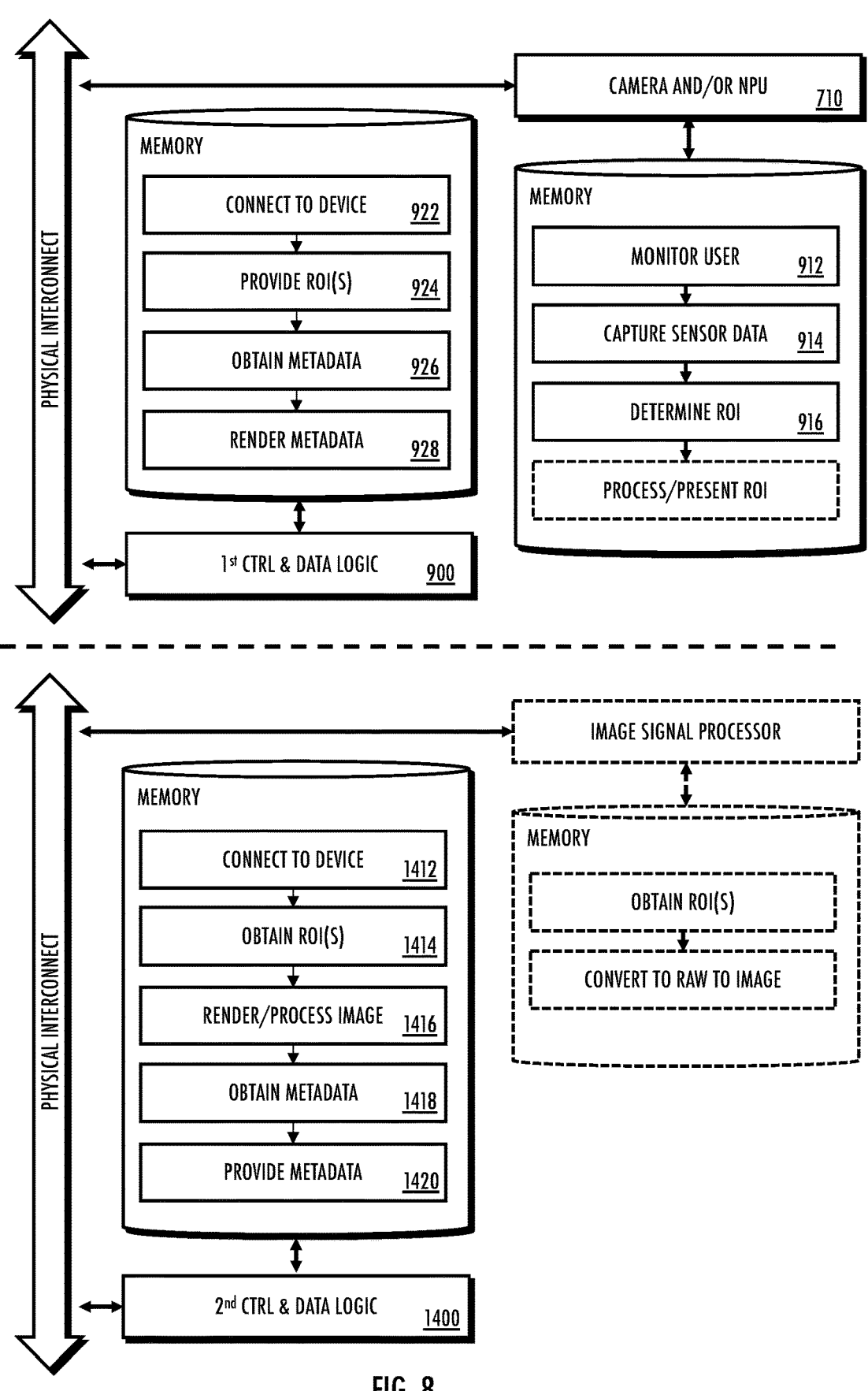
FIG. 8 depicts a generalized implementation of region-of-interest based processing, in accordance with various aspects of the present disclosure.

FIG. 8 depicts a generalized implementation of region-of-interest based processing. In addition, FIG. 9 depicts a chronological sequence (ladder diagram) of region-of-interest processing, according to the logic of FIG. 8. In the illustrated embodiment, the non-transitory computer-readable medium includes a first routine that performs region-of-interest based processing. When executed by the control and data subsystem, the first routine causes the user device to: monitor a user, capture raw/image data, and determine a region-of-interest. Furthermore, the user device may additionally: connect to a companion device and provide the region-of-interest. In some cases, the device may also: obtain metadata and render the metadata for the user. In some cases, the region-of-interest may be directly rendered for the user. The following discussion explores these steps in more detail.

As shown, the device monitors a user (step 912). In one exemplary embodiment, an eye-tracking camera sensor of the device monitors the user's eyes to determine when a user's gaze is fixated. More broadly, the device may monitor any user interaction, such as is described within e.g., U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", and U.S. patent application Ser. No. 18/061,257 filed Dec. 2, 2022, and entitled "SYSTEMS, APPARATUS, AND METHODS FOR GESTURE-BASED AUGMENTED REALITY, EXTENDED REALITY", previously incorporated by reference in their entireties. As noted therein, user interactions may include gaze fixation, gestures, limb motion (fingers, hand, arm, head, foot, etc.), speech, and/or emotion. For example, the device may monitor the user's gaze and/or hands to determine a gesture or the user's speech for voice commands.

In some implementations, the user device may monitor a user's environment. Environmental triggers may include e.g., other people/animals, location, movement, time, objects, and/or object proximity. For example, the device may monitor the surroundings for faces, bodies, vehicles, signs, and/or other salient indicia. In some cases, a scheduled time or place (calendar meeting, geofence, etc.) may trigger the device to monitor the surroundings. Still other implementations may be triggered by other devices. For example, proximity beacons and/or near-field emission (RFID) may trigger device monitoring. Yet other implementations may monitor a user's environment according to a periodicity, set time, or other temporal consideration.

Various embodiments of the present disclosure may incorporate scalable power management state machines and/or conditional logic to wake different stages of processing once a monitored condition has been fulfilled. In other words, scalable power management logic may ensure that different conditional requirements are met, before triggering the next stage. For example, the scalable power management logic may verify that a gaze is held on a specific object for a specific threshold of time, before inferring the presence of user attention (a first user interaction).

In one specific embodiment, the "scalable power management subsystem" implements logic in hardware, firmware, and/or software to adjust (scale) the power state based on a finite state machine. A finite state machine (or "state machine") refers to a machine that can only be in one of a finite number of "states". Each state has a limited set of valid inputs, outputs, and/or data manipulations. The state machine "transitions" between states in response to certain inputs. A machine is "stateful" if it can consider preceding events or interactions in its logic (i.e., it remembers at least a current and previous state), stateless logic does not consider preceding events/interactions.

In one specific implementation, the user device monitors user activity and/or the environment using a trained neural network. Since processing complexity is a function of the number nodes (rather than image size), and neural network processing may be performed on raw sensor data (rather than demosaiced image data), the neural network processing can be trained for very low power consumption (as described in greater detail elsewhere). For an eye-tracking implementation, the neural network determines when the user's gaze is fixated (determined from a threshold amplitude and threshold time). For a forward-facing implementation, the neural network determines when an object in the visual field could be of potential interest to the user. For example, the neural network may be trained to recognize a specific shape, face, etc.

At step 914, the user device captures sensor data. In one exemplary embodiment, the sensor data is an image or video captured by an outward-facing camera. Depending on the camera assembly, the image or video may have a designated field-of-view (FOV). For example, a telephoto lens may capture a narrow FOV, a wide-angle lens may capture a wide FOV, etc. Here, the light information may be captured within photosites and converted to image data or may be processed by a neural network to generate activation spikes. More generally, sensor data and its corresponding derivatives may be associated with any modality (electro-magnetic radiation, acoustic vibration, inertial motion, etc.), range, granularity, resolution, and/or any other quantity or quality metric. Examples of such information may include e.g., spike activations, tagged objects, time/location stamps, capture settings, and/or user annotations or other inputs. In other words, the device may capture and/or record multiple different streams of data as e.g., tracks within a media file or other data structure.

In some cases, the device may capture (or otherwise obtain) other contextual information. For example, smart glasses may identify its current location (via GPS, etc.) and/or the current time. Spatial and/or temporal contextual clues may be useful when cross-referenced to a user's schedule and/or route information. For instance, calendar information may include information about other meeting attendees.

At step 916, the user device determines a region-of-interest (ROI) from the sensor data. In one exemplary embodiment, the ROI may be based on a gaze point (or other user interaction) and/or detection and recognition algorithms (faces, text, objects, etc.) to determine the ROI.

While the foregoing scheme is based on a neural network-based ROI, reduced complexity variants may use a fixed localization scheme (i.e., the entire captured image data may be subdivided into regions). As but one such example, the entire captured image may be subdivided into a 3×3 grid, and the gaze point may be used to identify the appropriate sector for the ROI. Notably, such implementations could be under/over-inclusive, depending on the nature of the user's gaze—i.e., a gaze point at the boundary is likely to result in a ROI with only part of the interesting image information. Consequently, some such variants may have some degree of overlap and/or hysteresis during transitions to ensure that the ROI contains both the gaze point and some adjacent image data. More generally, any section-based system may be substituted with equal success (e.g., N×M grids, hexagonal gridding, mixed-polygon gridding, etc.).

In some embodiments, the user device may search for a potential ROI (PROI) for the user based on feature extraction, etc. Unlike user-identified ROIs, the PROI may be based on a set of factors which the device is trained to detect and recognize. The user may then independently confirm the PROI. In still other cases, other devices may push ROI suggestions to the device. Such implementations may be particularly useful for marketing and/or advertising implementations. More broadly, while the various discussions presented throughout are directed to user-driven ROIs, any scheme for ROI or PROI delivery may be substituted with equal success.

Various embodiments of the present disclosure augment the user's natural sensory capabilities with the sensor subsystem's sensor capabilities. While a human does not process "bits" of data in the same manner as a machine, a human can discern (or fail to discern) signal from noise. For example, the "naked" eye cannot discern between different symbols beyond a certain visual distance. Similarly, certain types of information (e.g., infrared radiation, acoustic waveforms) can only be perceived with certain sensory modalities (e.g., sight, touch, hearing, smell, etc.).

The term "augment" and its linguistic derivatives refer to a presentation of data that increases information and/or decreases undesirable noise for a user. Information may be presented at a different granularity, scale, range, or even modality of information. For example, "super vision" may allow a human to discern a visible object at great distance, "night vision" may allow a human to see a full spectrum of colors under low light (where red light would be difficult to perceive), and "thermal vision" may allow a human to see (rather than feel) temperature. Human perception is broader than pure sensory input; thus, the perception (and/or remembrance) of an event may also be augmented. Data accuracy is often much better, and may inform personal recollection. This may greatly enhance memories of a particular meeting, and catalogues of events.

While the disclosed embodiments describe a "region" of captured data that is associated with a user's interest, artisans of ordinary skill in the related arts will readily appreciate that any representative data may be substituted with equal success. Representative data may have a different size, resolution, geometry, frame rate, color palette, etc. than the originally captured sensor data. For example, a black-and-white image may be used to represent a full-color image. Similarly, a reduced resolution image may be used to represent a full-resolution image. Certain objects may have special importance; for example, people may be conveyed as "people of interest" (POI), places may be conveyed as "places of interest" (PLOI), etc. More directly, the ROI is not merely limited to spatial subsets, but can be broadly construed as any subset of the captured data.

In some embodiments, the ROI may be directly processed and/or presented to the user. For example, smart glasses may present a ROI of a telephoto image to the user directly via the smart glasses HUD. In some variants, the ROI may be used with image recognition or other post-processing to provide metadata. For example, an ROI of text may be OCR'd to provide text for display. In other examples, an ROI of a face may be paired with facial recognition to identify the person—the person's contact information may be displayed to the user, etc.

In most mobile ecosystems, a companion device may support the user device. Notably, most consumer electronics devices are designed for different usage scenarios and/or design goals than smart glasses. For example, phones and laptops are designed for infrequent handheld use and often have large batteries, heat sinks, and/or processing resources and peripherals (e.g., modems, codecs, etc.). As a practical matter, even if the smart glasses have the same components, it may be more efficient to offload these functions to nearby devices.

To these ends, some embodiments may further coordinate region-of-interest processing with a second routine that incorporates supplemental metadata, computer-assistance, database-assistance, and/or other device assistance. When executed by the control and data subsystem, the second routine causes a companion device to: connect to a user device and obtain a region-of-interest. In some cases, the region-of-interest may be converted to image data (from raw data). In other cases, the region-of-interest may be directly rendered/processed. Still other implementations may retrieve metadata and/or provide the metadata to the user device. The following discussion explores these steps in more detail.

In such embodiments, the user device may connect to a companion device (step 922 and complementary step 1412) and provide a ROI to the companion device (step 924 and complementary step 1414). Various embodiments of the present disclosure may transfer the ROI in its unencoded format (raw), developed format (pixel data), or even encoded format (audio/visual container). In some cases, the ROI may be transferred as grayscale; grayscale is suitable for most computer-vision applications and is substantially smaller than full color data. In some variants, the ROI may be additionally encoded, compressed, and/or otherwise formatted for data transmission. More generally, any sensor data, derived data and/or other metadata generated from the captured data may be transferred for analysis, storage, rendering, processing, or additional post-processing.

As used herein, the term "metadata" refers to descriptive data that provides information about the captured data or a portion of it (e.g., an ROI). Metadata is commonly used to convey format, time/location, keywords, tags, descriptions, etc. "Derived data" might include any data that is specifically derived from, or otherwise inferred from, the image content of the captured data or ROI itself. Examples might include e.g., text generated from OCR or audio analysis, URLs extracted from QR codes, spike activations, metadata tagging, and/or any other representation of data.

In some implementations, the companion device may need to pre-process or otherwise convert the ROI to another data format. In some cases, the companion device may have a variety of different co-processing accelerators that are specifically dedicated for these tasks. For example, an image signal processor may convert raw data to image data (as shown). Other examples may include software or hardware that e.g., decode encoded data, decompress compressed data, perform error detection, handle forward error correction, and/or any other transmission control.

While the foregoing examples are presented in the context of a smart glasses which communicate an ROI to a companion device, other implementations may reverse the roles of the smart glasses and its companion devices. For example, a smart car (user device) might capture image data of upcoming street signs, traffic conditions, etc. The appropriate ROI may be provided to the user's smart glasses (companion device) for audio, visual, and/or haptic alerts to ensure that the user is aware of the condition.

At step 1416, the companion device processes and/or renders the region-of-interest (ROI) data. In some embodiments, the ROI may be directly processed or presented to the user via the companion device. For example, the smart phone may present a ROI of a telephoto image (captured by the smart glasses) to the user. In some cases, the companion device may mirror the user device's display (e.g., both devices display the ROI). In other implementations, the companion device and the user device may display distinct versions of the ROI; e.g., a smart phone or laptop may have a different size, resolution, geometry, frame rate, color palette, etc. than the smart glasses. In some cases, differences in companion device capabilities may enable rendering and/or processing capabilities that are substantially different than the user device. Examples of such capabilities might include e.g. access to external network databases, more extensive processing, cloud computing resources, and/or more extensive user input. For example, a user might use their finger to manually drag the image on a touchscreen and/or open links to identified URLs, etc.

In some notable use cases, the companion device may have access to different network interfaces than the user device. As a brief aside, different wireless technologies trade-off different aspects of operation. For example, cellular networks often prioritize coverage over large geographic areas, and may require ongoing mobility management. In contrast, personal area networks (like Bluetooth, Wi-Fi, etc.) are ad hoc and/or user-specific and may prioritize very low ongoing power consumption. Thus, a smart phone might have access to cellular networks (and the broader Internet) and provide a hot spot for the smart glasses to tether onto.

At step 1418, the companion device may additionally obtain metadata based on the region-of-interest. For example, an ROI of text may be OCR'd to provide text for display. In other examples, an ROI of a face may be paired with facial recognition to identify the person and retrieve the person's contact information, etc. Audio variants may use speech analysis to extract spoken words, etc. This metadata may be locally used by the companion device, or provided to the user device (detailed in step 1420 below).

In some cases, the metadata may be retrieved from an external database. The external database may be specific to the user (e.g., an address book, calendar, etc.). In other embodiments, the external database may be de-referenced from the image or text; e.g., a QR code encode a URL to a server location, etc. Still other embodiments may be retrieved based on context; for example, a picture of street signs may be used to determine location via online map databases, a picture of a business card may be scraped for identifying contact information, etc.

In some variants, the companion device may provide the metadata to the user device (steps 1420 and complementary step 926), such that the user device may render or process the metadata for the user (step 928). Generally, smart glasses might be preferred where the application prioritizes unique aspects of the user's attention. For example, the smart glasses may display text for the user (such as a contact name), directional indicia (e.g., directional arrows), or other notices and/or alerts.

While the foregoing examples are shown with a specific division of processing logic and memories, other variants may subdivide, aggregate, and/or merge the tasks among any number of control and data processing logic. For example, the tasks may be performed entirely within one chip (e.g., no off-chip data transfers) or one device (e.g., no off-device transfers). Alternatively, the tasks may be performed across multiple chips and/or incorporate multiple devices (e.g., staged processing complexity).

Power Management Subsystem

The power management subsystem 1000 provides power to the system. Typically, power may be sourced from one or more power sources. Examples of power sources may include e.g., disposable and/or rechargeable chemical batteries, charge storage devices (e.g., super/ultra capacitors), and/or power generation devices (e.g., fuel cells, solar cells). Rechargeable power sources may additionally include charging circuitry (e.g., wired charging and/or wireless induction). In some variants, the power management subsystem may additionally include logic to control the thermal exhaust and/or power draw of the power sources for wearable applications.

During operation, the power management subsystem 1000 provides power to the components of the system based on their power state. In one exemplary embodiment, the power states may include an "off" or "sleep" state (no power), one or more low-power states, and an "on" state (full power). Transitions between power states may be described as "putting to sleep", "waking-up", and their various linguistic derivatives.

As but one such example, a camera sensor's processor may include: an "off" state that is completely unpowered; a "low-power" state that enables power, clocking, and logic to check interrupts; a "on" state that enables image capture. During operation, another processor may "awaken" the camera sensor's processor by providing power via the power management subsystem. After the camera sensor's processor enters its low-power state, it services the interrupt; if a capture is necessary, then the camera sensor's processor may transition from the "low-power" state to its "on" state.

Various other power management subsystems may be substituted with equal success, given the contents of the present disclosure.

Data/Network Interface Subsystem

Functionally, the data/network interface subsystem 1100 (and, if a second device is present, data/network interface subsystem 1500) enables communication between devices. For example, smart glasses may communicate with a companion device during operation. The companion device may be a smartphone, a computing device, a computer, a laptop, a server, a smart television, a kiosk, an interactive billboard, etc. In some cases, the system may also need to access remote data (accessed via an intermediary network). For example, a user may want to look up a menu from a QR code (which visually embeds a network URL) or store a captured picture to their social network. In some cases, the user may want to store media to removable data. These transactions may be handled by a data interface and/or a network interface.

The network interface may include both wired interfaces (e.g., Ethernet and USB) and/or wireless interfaces (e.g., cellular, local area network (LAN), personal area network (PAN)) to a communication network. As used herein, a "communication network" refers to an arrangement of logical nodes that enables data communication between endpoints (an endpoint is also a logical node). Each node of the communication network may be addressable by other nodes; typically, a unit of data (a data packet) may be traverse across multiple nodes in "hops" (a segment between two nodes). For example, smart glasses may directly connect, or indirectly tether to another device with access to, the Internet. "Tethering" also known as a "mobile hotspot" allows devices to share an internet connection with other devices. For example, as shown in FIG. 5, a smart phone may use a second network interface to connect to the broader Internet (e.g., 5G/6G cellular); the smart phone may provide a mobile hotspot for a smart glasses device over a first network interface (e.g., Bluetooth/Wi-Fi), etc.

The data interface may include one or more removeable media. Removeable media refers to a memory that may be attached/removed from the system. In some cases, the data interface may map ("mount") the removable media to the system's internal memory resources to expand the system's operational memory.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A smart glasses apparatus, comprising:
   a physical frame;
   a first camera assembly comprising a telephoto lens;

a second camera assembly;

a processor; and a non-transitory computer-readable medium comprising instructions that, when executed by the processor, cause the smart glasses apparatus to:

determine a distance to a target object;

select an appropriate camera assembly from the first camera assembly and the second camera assembly based on the distance;

capture an image of the target object with the appropriate camera assembly at a capture resolution; and digitally zoom a portion of the image from the capture resolution to a display resolution, where an amount of digital zoom is based on a duration of gaze fixation.

2. The smart glasses apparatus of claim 1, further comprising a display, where the capture resolution is greater than 60 pixels per degree.

3. The smart glasses apparatus of claim 2, where the display is characterized by the display resolution less than or equal to 60 pixels per degree.

4. The smart glasses apparatus of claim 1, where the portion of the image is cropped to the target object.

5. The smart glasses apparatus of claim 1, where a first portion of the image cropped to the target object is sent to a companion device for display.

6. The smart glasses apparatus of claim 5, where a second portion of the image adjacent to the first portion is sent to the companion device to enable active panning.

7. The smart glasses apparatus of claim 1, where an amount of digital zoom is also based on a hand gesture.

8. The smart glasses apparatus of claim 1, where the instructions, when executed by the processor, further cause the smart glasses apparatus to:

determining a gaze point of a wearer of the smart glasses apparatus; and determining the target object based on the gaze point of the wearer.

9. A smart glasses apparatus, comprising:

a physical frame;

an inward-facing camera assembly;

an outward-facing camera assembly comprising a telephoto lens;

a processor; and a non-transitory computer-readable medium comprising instructions that, when executed by the processor, cause the smart glasses apparatus to:

track eye movement via the inward-facing camera assembly;

determine gaze vectors based on the eye movement comprising a first gaze vector of a plurality of gaze vectors determined based on a first location of a first pupil of a first eye relative to a first retina of the first eye;

determine a gaze point based on the gaze vectors;

determine a target object based on the gaze point;

determine a distance of the target object; and capture an image via the telephoto lens of the outward-facing camera assembly based on the distance.

10. The smart glasses apparatus of claim 9, where:

a second gaze vector of the gaze vectors is determined from a second location of a second pupil of a second eye relative to a second retina of the second eye, and determining the distance comprises determining a convergence of the first gaze vector and the second gaze vector.

11. The smart glasses apparatus of claim 9, where the instructions, when executed by the processor, further cause the smart glasses apparatus to:

detect a face at the gaze point via the image; and crop a region-of-interest image from the image around the face.

12. The smart glasses apparatus of claim 11, further comprising a heads-up display, where the instructions, when executed by the processor, further cause the smart glasses apparatus to:

transfer the region-of-interest image to a companion device;

receive identification information associated with the face in the region-of-interest image from the companion device; and display the identification information on the heads-up display.

13. The smart glasses apparatus of claim 9, where the outward-facing camera assembly further comprises a periscope prism configured to divert light perpendicular to a capture direction.

14. The smart glasses apparatus of claim 9, where the instructions, when executed by the processor, further cause the smart glasses apparatus to:

perform a low-resolution image capture via the outward-facing camera assembly; and perform facial detection based on the low-resolution image capture.

15. A method of operating a smart glasses apparatus, comprising:

determining a target object based on a first image captured via a first camera assembly of a plurality of camera assemblies;

determining a distance to the target object;

selecting a second camera assembly from the plurality of camera assemblies based on the distance; and capturing a second image of the target object with the selected second camera assembly.

16. The method of claim 15, further comprising:

identifying the target object based on the second image;

determining historical information about the target object based on identifying the target object; and displaying the historical information via the smart glasses apparatus.

17. The method of claim 15, where selecting the selected second camera assembly is based on the distance being greater than a threshold distance.

18. The method of claim 15, where:

the first camera assembly comprises a wide-angle lens, the second camera assembly comprises a telephoto lens characterized by a smaller field-of-view than the wide-angle lens, and a first-field of view of the first image is greater than a second field-of-view of the second image.

19. A smart glasses apparatus, comprising:

a physical frame;

an inward-facing camera assembly;

an outward-facing camera assembly comprising a telephoto lens;

a processor; and a non-transitory computer-readable medium comprising instructions that, when executed by the processor, cause the smart glasses apparatus to:

track eye movement via the inward-facing camera assembly;

determine gaze vectors based on the eye movement;

determine a gaze point based on the gaze vectors;

determine a target object based on the gaze point;

determine a distance of the target object;

capture an image via the telephoto lens of the outward-facing camera assembly based on the distance;

detect a face at the gaze point via the image;

crop a region-of-interest image from the image around the face;

transfer the region-of-interest image to a companion device; and receive identification information associated with the face in the region-of-interest image from the companion device.

20. The smart glasses apparatus of claim 19, where the outward-facing camera assembly further comprises a periscope prism configured to divert light perpendicular to a capture direction.

21. The smart glasses apparatus of claim 19, where each of the gaze vectors are determined based on a relative location of a pupil and a retina.

22. The smart glasses apparatus of claim 21, where the gaze point is determined based on a convergence of the gaze vectors in space.

23. The smart glasses apparatus of claim 19, where the instructions, when executed by the processor, further cause the smart glasses apparatus to determine a gaze of a user is fixated.

24. The smart glasses apparatus of claim 23, where the instructions, when executed by the processor, further cause the smart glasses apparatus to determine the gaze point is responsive to determining the gaze is fixated.

25. The smart glasses apparatus of claim 19, further comprising a heads-up display, where the instructions, when executed by the processor, further cause the smart glasses apparatus to display the identification information on the heads-up display.

* * * * *